US012255395B2

(12) United States Patent
Wang et al.

(10) Patent No.: US 12,255,395 B2
(45) Date of Patent: Mar. 18, 2025

(54) ANTENNA, DISPLAY SUBSTRATE AND DISPLAY DEVICE

(71) Applicants: Beijing BOE Technology Development Co., Ltd., Beijing (CN); BOE Technology Group Co., Ltd., Beijing (CN)

(72) Inventors: Feng Wang, Beijing (CN); Tuo Sun, Beijing (CN); Yanzhao Li, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/018,853

(22) PCT Filed: Jan. 29, 2022

(86) PCT No.: PCT/CN2022/075062

§ 371 (c)(1),
(2) Date: Jan. 30, 2023

(87) PCT Pub. No.: WO2023/142063

PCT Pub. Date: Aug. 3, 2023

(65) Prior Publication Data

US 2024/0250444 A1 Jul. 25, 2024

(51) Int. Cl.

*H01Q 13/10* (2006.01)
*H01Q 1/22* (2006.01)
*H01Q 21/06* (2006.01)

(52) U.S. Cl.
CPC ............... *H01Q 13/10* (2013.01); *H01Q 1/22* (2013.01); *H01Q 21/064* (2013.01)

(58) Field of Classification Search
CPC ......... H01Q 13/10; H01Q 1/22; H01Q 21/064
See application file for complete search history.

(56) References Cited

U.S. PATENT DOCUMENTS

2011/0006953 A1 1/2011 Chiang et al.
2017/0194593 A1 7/2017 Ma et al.
(Continued)

FOREIGN PATENT DOCUMENTS

CN 101958456 A 1/2011
CN 105679795 A 6/2016
(Continued)

*Primary Examiner* — Hoang V Nguyen
(74) *Attorney, Agent, or Firm* — Ling Wu; Stephen Yang; Ling and Yang Intellectual Property

(57) ABSTRACT

An antenna, a display substrate and a display device are provided in the present disclosure, wherein the antenna includes a first conductive layer (11), a dielectric layer (12) and a second conductive layer (13) which are stacked; the first conductive layer (11) is provided with at least one slot (111); the second conductive layer (13) includes at least one conductive structure (130), the conductive structure (130) is a comb structure, the conductive structure (130) includes a first conductive element (131) and a plurality of second conductive elements (132), the first conductive element (131) constitutes a comb back of the comb structure, and the plurality of second conductive elements (132) constitute comb teeth of the comb structure; at least one conductive structure (130) is disposed corresponding to at least one slot (111).

18 Claims, 26 Drawing Sheets

(56) References Cited

U.S. PATENT DOCUMENTS

| | | | |
|---|---|---|---|
| 2018/0034130 | A1 | 2/2018 | Jang |
| 2021/0202638 | A1 | 7/2021 | Park et al. |
| 2023/0157093 | A1 | 5/2023 | Ye |

FOREIGN PATENT DOCUMENTS

| | | | | |
|---|---|---|---|---|
| CN | 107565046 | A | 1/2018 | |
| CN | 107665914 | A | 2/2018 | |
| CN | 208782000 | U | 4/2019 | |
| CN | 110380217 | B | 2/2021 | |
| CN | 112331708 | A | 2/2021 | |
| CN | 111048900 | B | 9/2021 | |
| CN | 113410620 | A | 9/2021 | |
| JP | H8-116211 | A | 5/1996 | |
| JP | 2001-111331 | A | 4/2001 | |
| WO | WO-2021204362 | A1 * | 10/2021 | ............ H01P 5/1007 |
| WO | 2021217793 | A1 | 11/2021 | |

* cited by examiner

ANTENNA, DISPLAY SUBSTRATE AND DISPLAY DEVICE

CROSS-REFERENCE TO RELATED APPLICATIONS

The present application is a U.S. National Phase Entry of International Application PCT/CN2022/075062 having an international filing date of Jan. 29, 2022, and the contents disclosed in the above-mentioned application are hereby incorporated as a part of this application.

TECHNICAL FIELD

Implementations of the present disclosure relate to, but are not limited to, the field of communication technologies, and in particular, relate to an antenna, a display panel and a display device.

BACKGROUND

With the development of wireless communication technology, mobile communication products have also developed rapidly. Mobile communication products may implement a function of data transmission and achieve a purpose of resource sharing. In mobile communication products, an antenna is one of the necessary components. An antenna is a kind of converter, which transforms guided waves transmitted on a transmission line into electromagnetic waves transmitted in an unbounded medium (usually free space), or vice versa. The antenna may implement functions of transmitting or receiving electromagnetic waves, and it is widely used in many fields such as communication, radar, navigation, broadcasting, television, remote sensing, radio astronomy, etc.

SUMMARY

The following is a summary of subject matters described herein in detail. The summary is not intended to limit the protection scope of claims.

In a first aspect, the implementation of the disclosure provides an antenna, including a first conductive layer, a dielectric layer and a second conductive layer which are stacked;

the first conductive layer is provided with at least one slot;

the second conductive layer includes at least one conductive structure, the conductive structure is a comb structure, the conductive structure includes a first conductive element and a plurality of second conductive elements, the first conductive element constitutes a comb back of the comb structure, and the plurality of second conductive elements constitute comb teeth of the comb structure;

at least one of the conductive structures is disposed corresponding to at least one of the slots, in at least one of the conductive structures, first ends of a plurality of second conductive elements are connected with the first conductive elements, and an orthographic projection of the second ends of at least a portion of the second conductive elements on the dielectric layer is within an orthographic projection of the slot on the dielectric layer.

In an exemplary implementation, the first conductive element includes: a first side and a second side oppositely disposed, and a third side and a fourth side oppositely disposed, the second conductive elements are located at the first side or the second side of the first conductive element;

the plurality of second conductive elements are arranged along a second direction;

the first conductive element has a grid structure or a strip structure.

In an exemplary implementation, the second conductive element includes a first sub-conductive element and a second sub-conductive element, wherein the first sub-conductive element and the second sub-conductive element are alternately disposed along the second direction;

the first sub-conductive element and the second sub-conductive element are hollow structures or solid structures;

the length of the first sub-conductive element along the first direction is greater than the length of the second sub-conductive element along the first direction; an orthographic projection of a second end of the first sub-conductive element on the dielectric layer is within the range of an orthographic projection of the slot on the dielectric layer, and an orthographic projection of a second end of the second sub-conductive element on the dielectric layer is not overlapped with the orthographic projection of the slot on the dielectric layer.

In an exemplary implementation, the dimensions of the first conductive line and the second conductive line along the second direction are 0.01 mm to 0.12 mm;

the length of the first conductive line along the first direction is 0.98 mm to 1.3 mm;

the length of the second conductive line along the first direction is 0.8 mm to 0.95 mm;

a distance between the centers of two adjacent second conductive elements is 0.02 mm to 0.4 mm;

the dimensions of the conductive structure along the arrangement direction of the plurality of second conductive elements are 1 mm to 2 mm, and the dimensions of the conductive structure along an extension direction of the second conductive elements are 1 mm to 2 mm.

In an exemplary implementation, the slot is provided with a dielectric, and the dielectric in the slot is formed by the same process as the dielectric layer;

in the arrangement direction of the plurality of second conductive elements, the orthographic projection of the slot on the dielectric layer exceeds the orthographic projection of the plurality of second conductive elements on the dielectric layer;

the second conductive layer is a transparent conductive layer.

In an exemplary implementation, the width of the slot is 40 microns to 110 microns, and the slot has a length of 3.6 millimeters to 5.0 millimeters in the arrangement direction of the plurality of second conductive elements.

In an exemplary implementation, the antenna further includes: a feeder line;

the feeder line is disposed at the third side or the fourth side of the first conductive element; or, the feeder line is disposed on the comb teeth at the end of the second conductive element.

In an exemplary implementation, the feeder line has a width of 20 to 60 microns; the sum of the lengths of the conductive structure and the feeder line in the arrangement direction of the plurality of second conductive elements is 2 mm to 3.5 mm.

In an exemplary implementation, the at least one slot includes a first slot and a second slot; the at least one conductive structure includes a first conductive structure and a second conductive structure;

the first conductive element in the first conductive structure and the first conductive element in the second conductive structure are connected.

In an exemplary implementation, an arrangement direction of the plurality of second conductive elements in the first conductive structure is parallel to an arrangement direction of the plurality of second conductive elements in the second conductive structure;

a first sub-conductive element in the first conductive structure and a first sub-conductive element in the second conductive structure are symmetrically disposed with respect to a center line of the first conductive structure and the second conductive structure along the second direction, a second sub-conductive element in the first conductive structure and a second sub-conductive element in the second conductive structure are disposed symmetrically with respect to a center line of the first conductive structure and the second conductive structure along the second direction.

In an exemplary implementation, an arrangement direction of the plurality of second conductive elements in the first conductive structure is parallel to an arrangement direction of the plurality of second conductive elements in the second conductive structure; in the plurality of second conductive elements, the first sub-conductive element constitutes a long tooth of the comb structure, and the second sub-conductive element constitutes a short tooth of the comb structure;

the first sub-conductive element in the first conductive structure and the second sub-conductive element in the second conductive structure are correspondingly disposed along the first direction to form a complementary structure of the long tooth and the short tooth in the first direction; the second sub-conductive element in the first conductive structure and the first sub-conductive element in the second conductive structure are correspondingly disposed along the first direction to forms a complementary structure of the long tooth and the short tooth in the first direction.

In an exemplary implementation, the first conductive element in the first conductive structure and the first conductive element in the second conductive structure are the same conductive element;

the second conductive element of the first conductive structure is located at a first side of the first conductive element, and the second conductive structure of the second conductive structure is located at a second side of the first conductive element.

In an exemplary implementation, the antenna further includes a first connection line, the first conductive element of the first conductive structure and the first conductive element of the second conductive structure are arranged in parallel and electrically connected through the first connection line, the first connection line is disposed to connect two ends of the comb back of the first conductive structure and the comb back of the second conductive structure which are close to each other.

In an exemplary implementation, the feeder line is connected with the first connection line, the feeder line divides the first connection line into a first sub-connection line and a second sub-connection line, the first sub-connection line is located between the feeder line and the first conductive structure, the second sub-connection line is located between the feeder line and the second conductive structure;

the length of the first connection line is the length of a wavelength of an electromagnetic wave transmitted or received by the antenna.

In an exemplary implementation, a longer one of the first sub-connection line and the second sub-connection line is of a straight line type or a polygonal line type.

In an exemplary implementation, an included angle between the first conductive element in the first conductive structure and the first conductive element in the second conductive structure is greater than 0 degree and less than 180 degrees.

In an exemplary implementation, the antenna further includes: a first connection line; the first conductive element of the first conductive structure and the first conductive element of the second conductive structure are electrically connected through the first connection line, the first connection line is disposed to connect two ends of the comb back of the first conductive structure and the comb back of the second conductive structure which are close to each other;

the feeder line is disposed at an end of the first conductive structure away from the second conductive structure, and the length of the first connection line is 0.7 times to 0.8 times of the length of the wavelength of the electromagnetic wave transmitted or received by the antenna; or, the feeder line is disposed at an end of the second conductive structure away from the first conductive structure, and the length of the first connection line is 0.7 times to 0.8 times of the length of the wavelength of the electromagnetic wave transmitted or received by the antenna; or, the feeder line is disposed on the first connection line, the feeder line divides the first connection line into a first sub-connection line and a second sub-connection line, the first sub-connection line is located between the feeder line and the first conductive structure, the second sub-connection line is located between the feeder line and the second conductive structure, the length of the first connection line is the length of the wavelength of the electromagnetic wave transmitted or received by the antenna, and the difference between the length of the first sub-connection line and the length of the second sub-connection line is 0.4 to 0.6 times of the length of the wavelength of the electromagnetic wave.

In an exemplary implementation, the at least one slot further includes a third slot and a fourth slot; the conductive structure of the at least one comb structure further includes a third conductive structure and a fourth conductive structure;

a first conductive element in the third conductive structure and a first conductive element in the fourth conductive structure are connected through at least one connection line; the at least one connection line includes a second connection line disposed to connect two ends of the comb back of the third conductive structure and the comb back of the fourth conductive structure which are close to each other.

In an exemplary implementation, the first conductive element in the second conductive structure and the first conductive element in the third conductive structure are connected through at least one connection line; the at least one connection line includes a third connection line disposed to connect two ends of the comb back of the second conductive structure and the comb back of the third conductive structure which are close to each other.

In an exemplary implementation, the at least one slot includes a common slot, the conductive structure of the at least one comb structure includes a fifth conductive structure and a sixth conductive structure, an arrangement direction of a plurality of second conductive elements in the fifth conductive structure is parallel to an arrangement direction of a plurality of second conductive elements in the sixth conductive structure;

a first conductive element in the fifth conductive structure is connected with the a conductive element in the sixth conductive structure;

an orthographic projection of the common slot on the dielectric layer is located between an orthographic projection of the fifth conductive structure and an orthographic projection of the sixth conductive structure on the dielectric layer;

orthographic projections of a second end of the first sub-conductive element in the fifth conductive structure and the sixth conductive structure on the dielectric layer are within the range of the orthographic projection of the common slot on the dielectric layer.

In an exemplary implementation, the first sub-conductive element in the fifth conductive structure and the first sub-conductive element in the sixth conductive structure are disposed symmetrically with respect to a center line of the fifth conductive structure and the sixth conductive structure along the second direction, the second sub-conductive element in the fifth conductive structure and the second sub-conductive element in the sixth conductive structure are disposed symmetrically with respect to the center line of the fifth conductive structure and the sixth conductive structure along the second direction;

In an exemplary implementation, in the plurality of second conductive elements, the first sub-conductive element constitutes a long tooth of the comb structure, and the second sub-conductive element constitutes a short tooth of the comb structure; the first sub-conductive element in the fifth conductive structure and the second sub-conductive element in the sixth conductive structure are disposed correspondingly along the first direction to form a complementary structure of the long tooth and the short tooth in the first direction; the second sub-conductive element in the fifth conductive structure and the first sub-conductive element in the sixth conductive structure are disposed correspondingly along the first direction to form a complementary structure of the long tooth and the short tooth in the first direction.

In an exemplary implementation, the antenna further includes a fourth connection line;

the first conductive element in the fifth conductive structure is connected with the first conductive element in the sixth conductive structure through the fourth connection line, the fourth connection line is disposed to connect two ends of the comb back of the fifth conductive structure and the comb back of the sixth conductive structure which are close to each other;

the feeder line is connected with the fourth connection line, the feeder line divides the fourth connection line into a first sub-connection line and a second sub-connection line, the first sub-connection line is located between the feeder line and the fifth conductive structure, the second sub-connection line is located between the feeder line and the sixth conductive structure;

the length of the fourth connection line is the length of the wavelength of the electromagnetic wave transmitted or received by the antenna.

In an exemplary implementation, the length of the first sub-connection line is equal to the length of the second sub-connection line, or the difference between the length of the first sub-connection line and the length of the second sub-connection line is 0.4 to 0.6 times of the length of the wavelength of the electromagnetic wave.

In an exemplary implementation, the conductive structure of the comb structure includes at least one positive radiation field and at least one negative radiation field, the positive radiation field of the antenna corresponds to a region of the first sub-conductive element, and the negative radiation field of the antenna corresponds to a region of the second sub-conductive element; or, the negative radiation field of the antenna corresponds to the region of the first sub-conductive element, and the positive radiation field of the antenna corresponds to the region of the second sub-conductive element.

In a second aspect, the implementation of the present disclosure provides a display substrate including a display region and a non-display region; the display region is provided with a plurality of sub-pixels arranged in an array; the display substrate further includes the antenna according to any one of the above implementations, wherein the antenna is located in the display region and the non-display region;

the display substrate is provided along a third direction with a base substrate and a drive structure layer, a light emitting structure layer, a power supply line layer and an encapsulation layer which are sequentially stacked on the base substrate; the drive structure layer includes a pixel drive circuit located in the display region, the light emitting structure layer includes a plurality of light emitting elements located in the display region, the sub-pixel includes a pixel drive circuit and a light emitting element, and the power supply line layer includes a low-level power supply line; the low-level power supply line is electrically connected with the light emitting element;

an orthographic projection of the second conductive layer in the antenna on the base substrate is not overlapped with an orthographic projection of the plurality of light emitting elements on the base substrate.

In an exemplary implementation, the power supply line layer is multiplexed into a first conductive layer of an antenna, and the second conductive layer of the antenna is located at a side of the encapsulation layer away from the base substrate;

a part of the low-level power supply line located at the non-display region is provided with a slot, a surface of the low-level power supply line away from the display region and/or close to the display region is not flat, and the thickness of the low-level power supply line provided with the slot along the first direction is greater than the thickness of the low-level power supply line without the slot.

In an exemplary implementation, the encapsulation layer is multiplexed into a dielectric layer of the antenna.

In an exemplary implementation, the display substrate further includes a touch structure layer and a transparent insulation layer; the touch structure layer is located at a side of the encapsulation layer away from the base substrate, the second conductive layer of the antenna is located at a side of the touch structure layer away from the encapsulation layer, and the transparent insulation layer is disposed between the second conductive layer and the touch structure layer;

the transparent insulation layer is multiplexed into a dielectric layer of the antenna, and the touch structure layer is multiplexed into a first conductive layer of the antenna;

the touch structure layer includes a touch electrode layer; the touch electrode layer includes a touch electrode located in the display region and a touch trace located in the non-display region;

an orthographic projection of the touch structure layer on the base substrate is not overlapped with an orthographic projection of the slot on the base substrate, and an orthographic projection of the touch trace on the base substrate is overlapped with an orthographic projection of the second conductive layer in the antenna on the base substrate.

In an exemplary implementation, the second conductive layer includes at least one conductive structure, the conductive structure is a comb structure, the conductive structure includes a first conductive element constituting a comb back of the comb structure and a plurality of second conductive elements constituting comb teeth of the comb structure;

the first conductive element is located in the display region, first ends of the plurality of second conductive elements are located in the display region, second ends of the plurality of second conductive elements are located in the non-display region, the first ends of the plurality of second conductive elements are connected with the first conductive elements, and an orthographic projection of the second ends of at least a portion of the second conductive elements on the base substrate is within the range of an orthographic projection of the slot on the base substrate.

In an exemplary implementation, the first conductive element and the second conductive element are solid structures, in the display region, the first conductive element and the second conductive element are disposed in spaced regions of a plurality of sub-pixels, and orthographic projections of the first conductive element and the second conductive element on the base substrate are not overlapped with the orthographic projections of the plurality of pixels on the base substrate.

In an exemplary implementation, at least one of the first conductive element and the second conductive element is a hollow structure provided with a hollowed-out structure, an orthographic projection of the first conductive element provided with the hollowed-out structure and the second conductive element provided with the hollowed-out structure on the base substrate and an orthographic projection of a portion of sub-pixels of the plurality of sub-pixels on the base substrate have an overlapped region, and the overlapped region is within the range of the orthographic projection of the hollowed-out structure on the base substrate.

In an exemplary implementation, the first conductive element is provided as a grid structure, grid lines of the grid structure are disposed in spaced regions of adjacent sub-pixels, and orthographic projections of the grid lines of the grid structure on the base substrate is not overlapped with the orthographic projections of the plurality of sub-pixels on the base substrate.

In a third aspect, an implementation of the present disclosure provides a display device, including the display substrate according to any one of the implementations described above.

Other aspects may be understood upon reading and understanding the drawings and the detailed description.

BRIEF DESCRIPTION OF DRAWINGS

The drawings are intended to provide a further understanding of technical solutions of the present disclosure and form a part of the specification, and are used to explain the technical solutions of the present disclosure together with implementations of the present disclosure, and not intended to form limitations on the technical solutions of the present disclosure. Shapes and sizes of each component in the drawings do not reflect actual scales, and are only intended to schematically illustrate contents of the present disclosure.

DETAILED DESCRIPTION

Figure 1A:
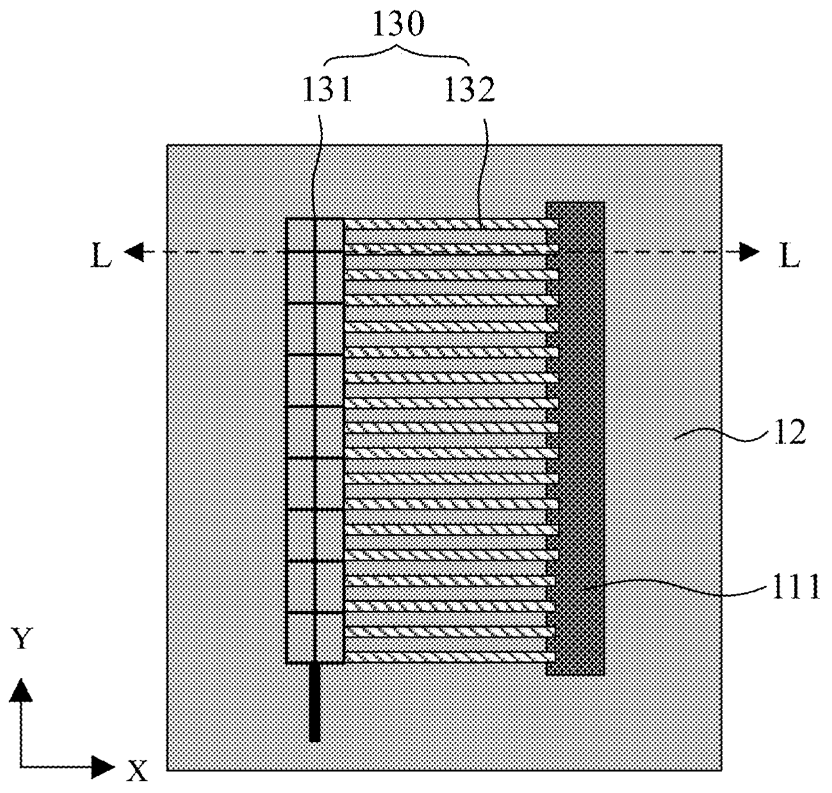
FIG. 1*a* is a schematic diagram of a planar structure of an antenna according to an implementation of the present disclosure.

The implementations of the present disclosure will be described in detail below with reference to the drawings. Implementations may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The implementations in the present disclosure and features in the implementations may be combined randomly with each other without conflict. In order to keep following description of the implementations of the present disclosure clear and concise, detailed descriptions about part of known functions and known components are omitted in the present disclosure. The drawings of the implementations of the present disclosure only involve structures involved in the implementations of the present disclosure, and other structures may refer to usual designs.

Scales of the drawings in the present disclosure may be used as a reference in the actual process, but are not limited thereto. For example, a thickness and a pitch of each film layer, and a width and a pitch of each signal line may be adjusted according to an actual situation. The drawings described in the present disclosure are only schematic diagrams of structures, and one mode of the present disclosure is not limited to shapes or numerical values or the like shown in the drawings.

Ordinal numerals such as “first”, “second”, and “third” in the specification are set to avoid confusion of constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to a direction according to which each constituent element is described. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, “electrical connection” includes a case that constituent elements are connected together through an element with a certain electrical effect. The “element with the certain electrical effect” is not particularly limited as long as electrical signals may be sent and received between the connected constituent elements. Examples of the “element having some electrical function” not only include an electrode and a wiring, but also a switch element such as a transistor, a resistor, an inductor, a capacitor, another element having one or more functions, and the like.

In the specification, “parallel” refers to a state in which an angle formed by two straight lines is −10° or more and 10° or less, and thus may include a state in which the angle is −5° or more and 5° or less. In addition, “perpendicular” refers to a state in which an angle formed by two straight lines is above 80 degrees and below 100 degrees, and thus may include a state in which the angle is above 85 degrees and below 95 degrees.

In the specification, a “film” and a “layer” are interchangeable. For example, a “conductive layer” may be replaced with a “conductive film” sometimes. Similarly, an “insulating film” may be replaced with an “insulation layer” sometimes.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be guide angle, arc edge and deformation, etc.

In the present disclosure, “about” refers to that a boundary is defined not so strictly and numerical values within process and measurement error ranges are allowed.

In the present disclosure, a “thickness” is a dimension of a film layer in a direction perpendicular to a substrate.

The “transmittance” in the present disclosure refers to an ability of light to pass through a medium, and is a percentage of the luminous flux passing through a transparent or translucent body to its incident luminous flux.

In mobile terminals such as mobile phones, notebook computers and automobile glass, as well as wireless applications such as microsatellites, intelligent buildings, intelligent windows, smart wearable devices and on-board communication devices, the various microwave communication devices that are miniaturized and thin-filmed, such as transmission lines, waveguides and antennas, have become a development trend. The thin-filmed traditional large-size microwave device facilitates the conformal structure design and reduces the weight and cost of communication systems.

Especially in recent years, mobile terminals (such as mobile phones) are developing towards ultra-thin, full-screen, and compatible with a series of communication functions, such as the fifth generation mobile communication technology (5G)/fourth generation mobile communication technology (4G)/third generation mobile communication technology (3G)/second generation mobile communication technology (2G), Wireless Fidelity (WIFI), such as WIFI), Near Field Communication (NFC), Bluetooth, Global Positioning System (GPS), China BeiDou Navigation Satellite System (BDS), wireless charging and the like, therefore, the design space reserved for antenna is extremely limited. Moreover, the existing antenna structure of mobile terminals cannot meet the requirements of simultaneously covering multiple frequency bands used for 5G millimeter waves. In addition, the propagation loss of 5G millimeter wave is large. In order to ensure the antenna gain, it is necessary to arrange the antenna, which requires more space to arrange the antenna. These contradictions objectively promote the demand of on-screen antenna. By designing on-screen antenna with good concealment performance, the above-mentioned shortage of design space can be alleviated. At present, transparent oxide conductive materials, such as Indium Tin Oxide (ITO), or multi-layer film materials of metal and conductive oxide, or metal mesh films, are commonly used to achieve transparent antenna design.

In related technologies, the on-screen antenna of the mobile terminal is mainly constructed on the flexible film, and then the flexible film is attached to the screen of the mobile terminal. Since this film attachment process cannot achieve accurate alignment in the semiconductor process, there is an obvious phenomenon that the antenna shields various pixels in the screen, which is easy to produce shielded dark lines and Moire Fringes. In addition, since the metal wires constituting the antenna in the antenna region will block a portion of the incident light, so that the transmittances of the antenna region and the non-antenna region on the screen are not consistent. In order to make the transmittance of the non-antenna region consistent with that of the antenna region as much as possible and passivate the visual effect of inconsistent transmittance, it is usually necessary to construct a grid pattern structure similar to that of the antenna region in the non-antenna region of the screen, so that the transmittance of the whole screen is reduced by 5% to 20%. If a method in which a touch panel (TP) is integrated on a screen encapsulation layer (E. G. OLED encapsulation layer) is directly adopted, although precise alignment in semiconductor technology can be adopted, the radiation efficiency is only about 2.8% according to the radiation theory of microstrip antenna patch due to a fact that the encapsulation layer is only 10 microns away from the metal cathode in the screen. Since the radiation efficiency is too low, it is basically infeasible to directly use semiconductor lithography alignment technology to manufacture antennas.

The implementation of the disclosure provides an antenna, which may include a first conductive layer, a dielectric layer and a second conductive layer that are stacked;

- the first conductive layer is provided with at least one slot;
- the second conductive layer includes at least one conductive structure, the conductive structure is a comb structure, the conductive structure includes a first conductive element and a plurality of second conductive elements, the first conductive element constitutes a comb back of the comb structure, and the plurality of second conductive elements constitute comb teeth of the comb structure;
- the conductive structure of at least one comb structure is disposed corresponding to at least one slot, in at least one of the conductive structures, first ends of a plurality of second conductive elements are connected with the first conductive elements, and an orthographic projection of the second ends of at least a portion of the second conductive elements on the dielectric layer is within an orthographic projection of the slot on the dielectric layer.

The antenna provided by an implementation of the present disclosure includes a first conductive layer, a dielectric layer, a second conductive layer which are stacked, a slot is provided on the first conductive layer, a conductive structure of a comb structure is disposed on the second conductive layer, the conductive structure includes a first conductive element and a plurality of second conductive elements, the first conductive element constitutes a comb back of the comb structure, the plurality of second conductive elements constitute a comb teeth of the comb structure, the radiation efficiency of the antenna is greatly improved by providing a slot on the first conductive layer, and an orthographic projection of the second end of at least a portion of a second conductive element on the dielectric layer in the conductive structure of the comb structure on the second conductive layer is within the range of an orthographic projection of the slot on the dielectric layer.

Figure 1B:
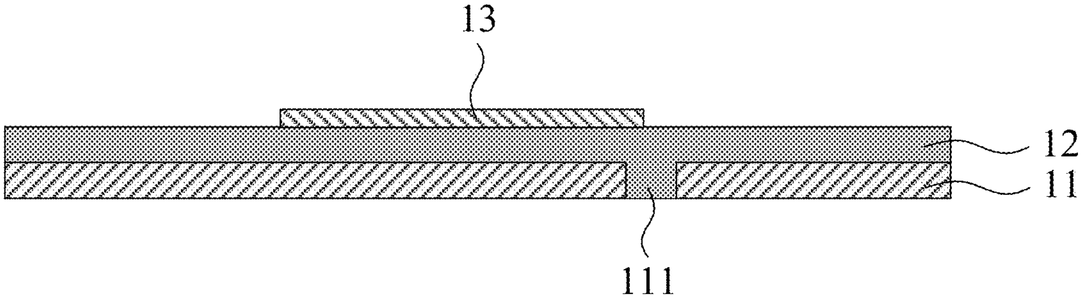
FIG. 1*b* is a schematic diagram of a sectional structure of the L-L position in FIG. 1*a*.

FIG. 1*a* is a schematic diagram of a planar structure of an antenna according to an implementation of the present disclosure. FIG. 1*b* is a schematic diagram of a sectional structure of the L-L position in FIG. 1*a*. FIG. 1*d* is a schematic diagram of a planar structure of another antenna according to an implementation of the present disclosure. As shown in FIG. 1*a*, FIG. 1*b* and FIG. 1*d*, the antenna may include a first conductive layer 11, a dielectric layer 12, a second conductive layer 13 which are stacked; wherein,

- the first conductive layer 11 is provided with at least one slot 111;
- the second conductive layer 13 may include at least one conductive structure 130, the conductive structure 130 is a comb structure, the conductive structure 130 may include a first conductive element 131 constituting a comb back of the comb structure and a plurality of second conductive elements 132 constituting comb teeth of the comb structure;
- the at least one conductive structure 130 is disposed corresponding to at least one slot 111, In the at least one conductive structure 130, first ends of the plurality of second conductive elements 132 are connected with the first conductive elements 131, and an orthographic projection of the second ends of at least a portion of the second conductive elements 132 on the dielectric layer 11 is within an orthographic projection of the slot 111 on the dielectric layer 11.

In the configuration shown in FIG. 1*a* the orthographic projection of the second ends of all the second conductive elements 132 on the dielectric layer 11 is within the range of the orthographic projection of the slots 111 on the dielectric layer 11.

In the structure shown in FIG. 1*d*, the orthographic projection of the second ends of a portion of the second conductive element 132 on the dielectric layer 11 is within the range of the orthographic projection of the slot 111 on the dielectric layer 11; the orthographic projection of the second ends of the other portion of the second conductive element 132 on the dielectric layer 11 does not fall within the range of the orthographic projection of the slot 111 on the dielectric layer 11, i.e. the orthographic projection of the other portion of the second conductive element 132 on the dielectric layer 11 is not overlapped with the orthographic projection of the slot 111 on the dielectric layer 11 in FIG. 1*d*.

In an exemplary implementation, a dielectric is provided in the slot 111 and the dielectric in the slot 111 is formed by the same process as the dielectric layer 12. In the implementation of the present disclosure, the formation of the dielectric in the slot 111 and the dielectric layer 12 by the same process can simplify the technological process and reduce the cost of manufacturing the antenna. In the implementation of the present disclosure, the dielectric in the slot 111 is not limited to being the same as the dielectric of the dielectric layer 12, and a dielectric different from the dielectric layer 12 may be employed, for example, the dielectric constant in the slot 111 may be greater than the dielectric constant of the dielectric layer 12. In the implementation of the present disclosure, the dielectric in the slot 111 is not limited to being formed by the same process as the dielectric layer 12 and may be manufactured by a different process than the dielectric layer 12.

In an exemplary implementation, the width W2 of the slot 111 is 40 microns to 110 microns, the length L4 of the slot 111 in an arrangement direction of the plurality of second conductive elements 132 (direction Y) is 3.6 mm to 5.0 mm, and in the arrangement direction of the plurality of second conductive elements 132, the orthographic projection of the slot 111 on the dielectric layer 12 exceeds the orthographic projection of the plurality of second conductive elements 132 on the dielectric layer 12, as shown in FIG. 1*a*-FIG. 1*d*, in the second direction Y, an upper end of the orthographic projection of the slot 111 on the dielectric layer 12 is higher than an upper end of the orthographic projection of the plurality of second conductive elements 132 on the dielectric layer 12, and a lower end of the orthographic projection of the slot 111 on the dielectric layer 12 is lower than a lower end of the orthographic projection of the plurality of second conductive elements 132 on the dielectric layer 12. In implementations of the present disclosure, the orthographic projection of the slot 111 on the dielectric layer 12 exceeds the orthographic projection of the plurality of second conductive elements 132 on the dielectric layer 12, such that the orthographic projection of the second ends of all the first sub-conductive elements 1321 in the second conductive element 132 on the dielectric layer 12 can fall within the range of the slot 111, therefore, the electromagnetic wave energy on the first sub-conductive elements 1321 can be transmitted from the slot 111.

In an exemplary implementation, as shown in FIG. 1*a*, FIG. 1*c*, FIG. 2*a*-FIG. 2*e*, the first conductive element 131 includes a first side A1 and a second side A2 disposed oppositely, and a third side A3 and a fourth side A4 disposed oppositely, the second conductive element 132 being located at the first side A1 or the second side A2 of the first conductive element 131; the plurality of second conductive elements 132 are arranged along the second direction (direction Y).

Figure 1C:
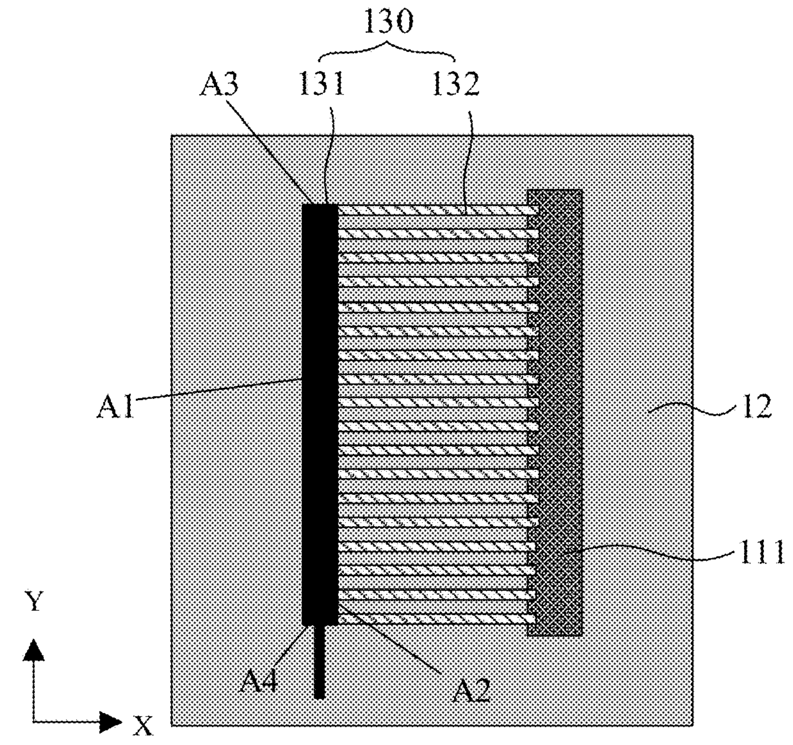
FIG. 1*c* is a schematic diagram of a planar structure of another antenna according to an implementation of the present disclosure.
Figure 1D:
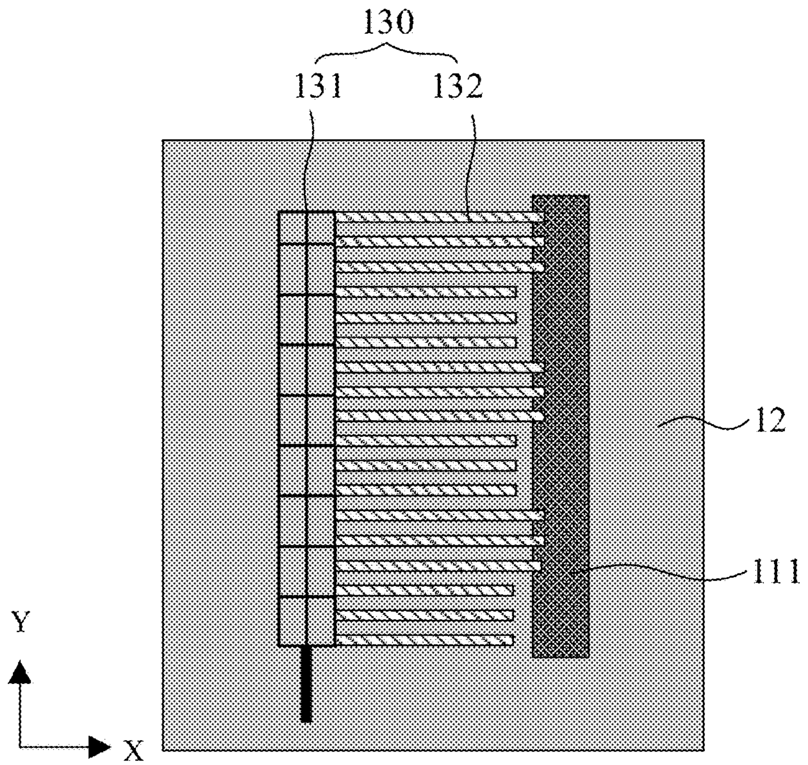
FIG. 1*d* is a schematic diagram of a planar structure of another antenna according to an implementation of the present disclosure.

In an exemplary implementation, the first conductive element 131 may adopt a grid structure as illustrated in FIG. 1*a*; or, as shown in FIG. 1*c*, the first conductive element 131 may be a non-grid structure, for example, the first conductive element 131 may be a strip structure.

In an exemplary implementation, as shown in FIG. 2*a*-FIG. 2*e*, the second conductive element 132 includes a first sub-conductive element 1321 and a second sub-conductive element 1322, wherein the first sub-conductive element 1321 and the second sub-conductive element 1322 are alternately arranged along the second direction (direction Y);

- the plurality of first sub-conductive elements 1321 may be a plurality of first conductive lines a1 extending along the first direction (direction X), and the plurality of first conductive lines a1 are arranged along the second direction (direction Y);
- the plurality of second sub-conductive elements 1322 may be a plurality of second conductive lines a2 extending along the first direction (direction X) and arranged along the second direction (direction Y);
- the length of the first sub-conductive element 1321 along the first direction (direction X) is greater than the length of the second sub-conductive element 1322 along the first direction (direction X), an orthographic projection of the second ends of the first sub-conductive elements 1321 on the dielectric layer 12 is within the range of the orthographic projection of the slot 111 on the dielectric layer 12, and an orthographic projection of the second ends of the second sub-conductive elements 1322 on the dielectric layer 111 is not overlapped with the orthographic projection of the slot 111 on the dielectric layer 12.

In an exemplary implementation, the first conductive line a and the second conductive line a2 are of a hollow structure or a solid structure, i.e. the first sub-conductive element 1321 and the second sub-conductive element 1322 are of a hollow structure or a solid structure.

Figure 2A:
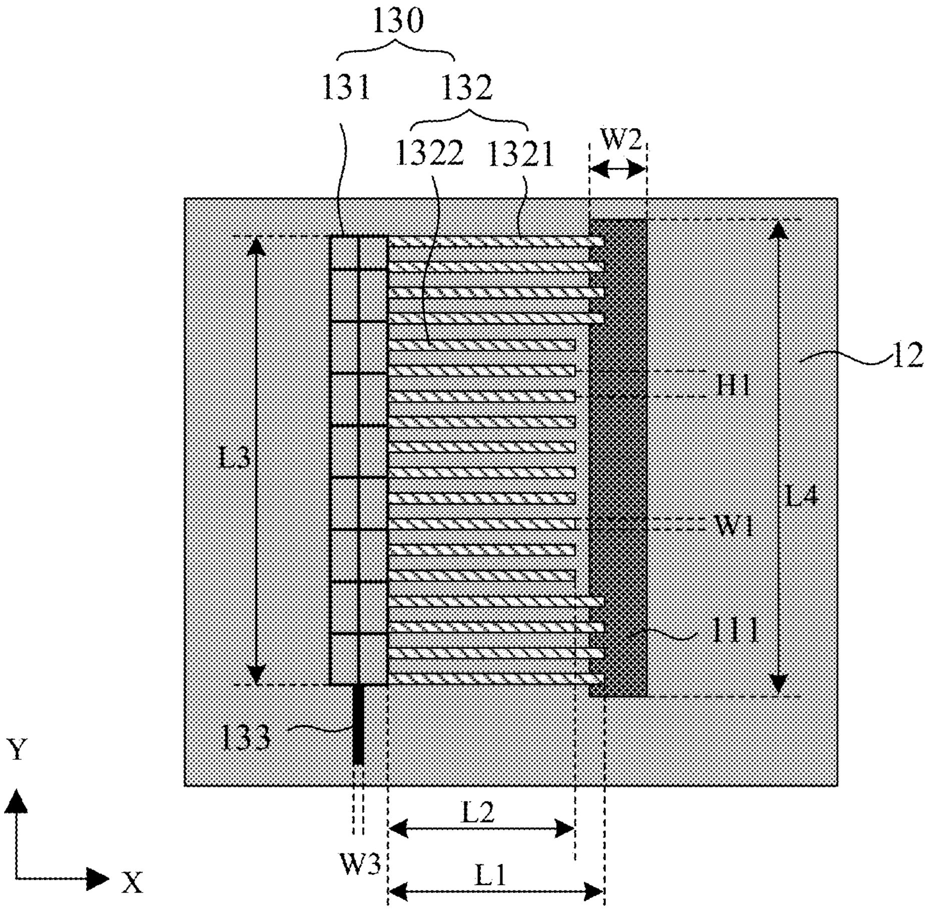
FIG. 2*a* is a schematic diagram of a planar structure of an antenna according to an exemplary implementation of the present disclosure.
Figure 2B:
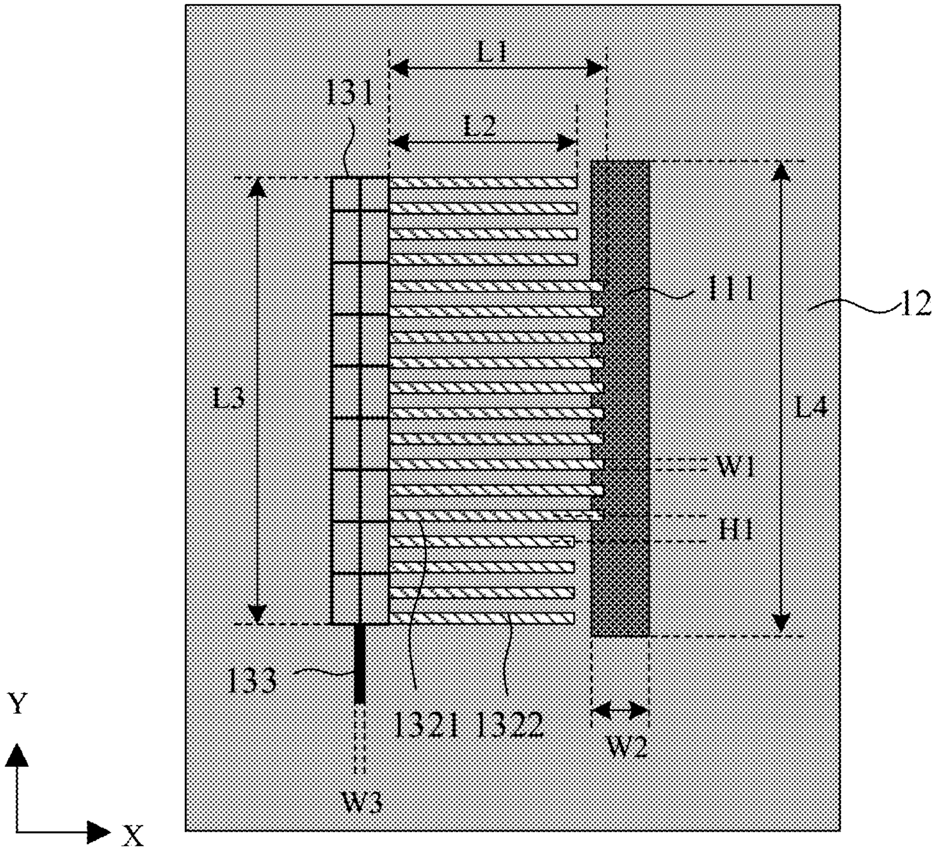
FIG. 2*b* is a schematic diagram of a planar structure of an antenna according to an exemplary implementation of the present disclosure.
Figure 2C:
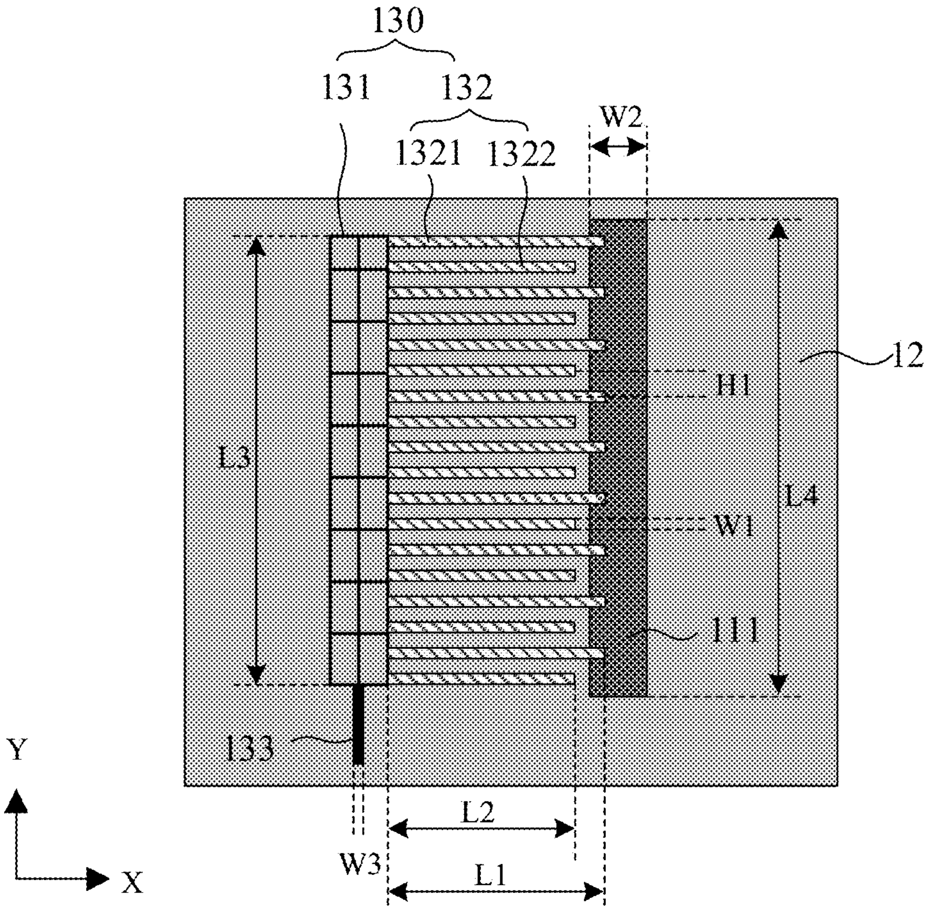
FIG. 2*c* is a schematic diagram of a planar structure of an antenna according to an exemplary implementation of the present disclosure.
Figure 2D:
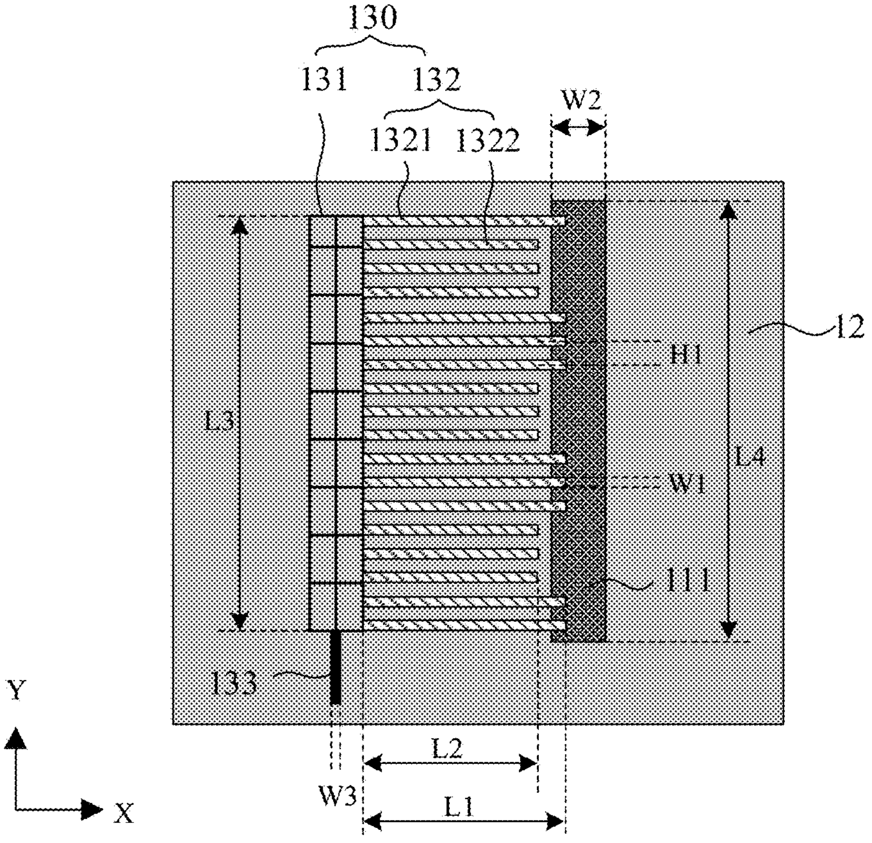
FIG. 2*d* is a schematic diagram of a planar structure of an antenna according to an exemplary implementation of the present disclosure.
Figure 2E:
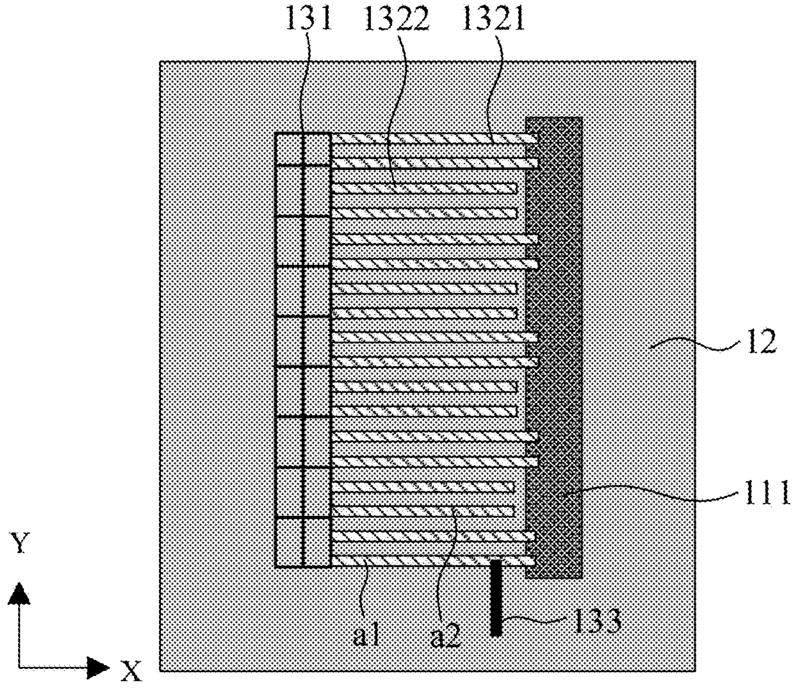
FIG. 2*e* is a schematic diagram of a planar structure of an antenna according to an exemplary implementation of the present disclosure.

In an exemplary implementation, the first sub-conductive element 1321 and the second sub-conductive element 1322 are alternately arranged along the second direction (direction Y), and as shown in FIG. 2*c*, one first conductive line a1 (i.e., the first sub-conductive element 1321) and one second conductive line a2 (i.e., the second sub-conductive element 1322) are alternately arranged along the second direction (direction Y). In the implementation of the present disclosure, not only one first sub-conductive element 1321 and one second sub-conductive element 1322 are alternately disposed along the second direction Y, but also two first sub-conductive elements 1321 and two second sub-conductive elements 1322 may be alternately disposed in the second direction (direction Y) as shown in FIG. 2*e*; alternatively, as shown in FIG. 2*a*, FIG. 2*b*, and FIG. 2*d*, in a comb-shaped conductive structure 130, one or more first sub-conductive elements 1321 and one or more second sub-conductive elements 1322 are alternately disposed along the second direction (direction Y).

In an exemplary implementation, the conductive structure 130 of the comb structure is an artificial surface plasmon structure. In an exemplary implementation, the artificial surface plasmon structure can be a conductive structure of an ultra-thin comb structure, the first conductive structure 11 acts as a metallic ground, the conductive structure of ultra-thin comb structure has only one layer of metal film. To tightly bind the electromagnetic energy, in many application scenarios, it is required that the metallic ground (the first conductive structure 11) is close to the conductive structure of the comb structure, a large portion of the electromagnetic energy is bound between the metallic ground (the first conductive structure 11) and the conductive structure of the comb structure. Similar to microstrip transmission lines, the small distance between the metallic ground and the conductive structure of the comb structure brings a problem of low radiation efficiency of the antenna, implementations of the present disclosure are provided with slots 111 on the first conductive layer 11, such that the orthographic projection of the second ends of at least a portion of the second conductive elements 132 on the dielectric layer 12 is within the range of the orthographic projection of the slot 111 on the dielectric layer 11, the electromagnetic wave energy projected on the comb teeth in the slot can be transmitted from the slot without being bound between the metal ground and the conductive structure of the comb structure, thus improving the radiation efficiency of the antenna.

In an exemplary implementation, the second conductive layer 13 is a transparent conductive layer which can increase transparency, and the application of the antenna in the display device can reduce the occlusion of the screen in the display device and increase the light transmittance.

In an exemplary implementation, each conductive structure of the comb structure includes at least one positive radiation field and at least one negative radiation field, the positive radiation field of the antenna corresponds to a region of the first sub-conductive element 1321, the negative radiation field of the antenna corresponds to a region of the second sub-conductive element 1322; or, the negative radiation field of the antenna corresponds to the region of the first sub-conductive element 1321 and the positive radiation field of the antenna corresponds to the region of the second sub-conductive element 1322.

Figure 3:
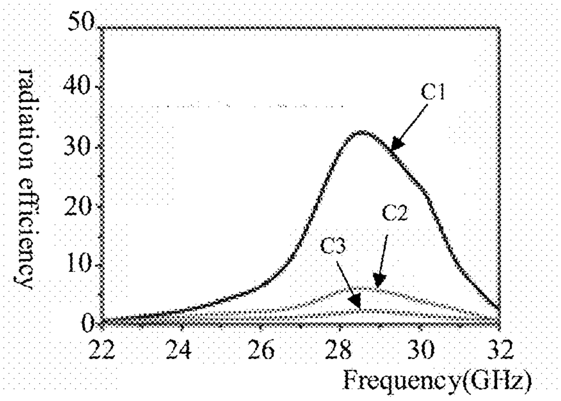
FIG. 3 is a graph of a corresponding relationship between radiation efficiency and frequency of different antenna structures according to exemplary implementations of the present disclosure.

In implementations of the present disclosure, since the first sub-conductive element 1321 and the second sub-conductive element 1322 are alternately disposed, in the traveling distance of the electromagnetic wave along the conductive structure of comb structure, a positive radiation field and a negative radiation field are periodically formed in the arrangement direction of the second conductive element 132. If both the positive radiation field and the negative radiation field are radiated into the free space through the slot, the total radiation field of the far field may be balanced in positive and negative, which reduces the radiation efficiency to a certain extent. Implementations of the present disclosure adopts the alternate arrangement of first sub-conductive elements 1321 (i.e. long teeth of the comb structure) and second sub-conductive elements 1322 (i.e. short teeth of the comb structure), and only the projection of the second ends of the first sub-conductive elements 1321 fall into the slot 111, while the projection of the second ends of the second sub-conductive elements 1322 do not fall into the slot 111. When designing the conductive structure of the comb structure in the antenna, two kinds of radiation fields in different directions (including positive radiation field and negative radiation field) are respectively aligned to the region corresponding to the first sub-conductive element 1321 and the region corresponding to the second sub-conductive element 1322. Since the radiation ability of the long and short teeth in the slot are different, coherence enhancement will be formed in the far field instead of coherence subtraction, thus further enhancing the radiation efficiency of the antenna. As shown in FIG. 3, C1 is a graph showing the relationship between the radiation efficiency and frequency of the antenna in which the slot is provided and the first sub-conductive elements 1321 and the second sub-conductive elements 1321 and 1322 are alternately arranged as shown in FIG. 2*a*-FIG. 2*e*, C2 is a graph showing the relationship between the radiation efficiency and frequency of the antenna in which the slot is provided as shown in FIG. 1*a*, and C3 is a graph showing the relationship between the radiation efficiency and frequency of the antenna in which the slot is not provided. As can be seen from FIG. 3, in the antenna structure at a frequency of 28 GHz, the radiation efficiency of the antenna provided with the slot (corresponding to graph C2) is increased by about 1.6 times compared with the antenna without slots (corresponding to graph C3); compared with the antenna without the slot (corresponding to graph C3), the radiation efficiency of the antenna provided with the slot and alternated long and short teeth (corresponding to C1) is increased by more than 10 times.

In implementations of the present disclosure, the radiation efficiency of the antenna refers to the ratio of the power delivered to the antenna to the power radiated by the antenna.

In an exemplary implementation, in the case where the conductive structure of the comb structure adopts an artificial surface plasmon structure, the conductive structure 130 has a size of 1 mm to 2 mm along the arrangement direction of the plurality of second conductive elements 132 (the direction Y in FIG. 2*a*), and the conductive structure 130 has a size of 1 mm to 2 mm along an extension direction of the second conductive elements (the direction X in FIG. 2*a*). For example, the size of the antenna may be 1.5 mm*1.5 mm, i.e. the conductive structure 130 has a size of 1.5 mm along the arrangement direction of the plurality of second conductive elements 132 (the direction Y in FIG. 2*a*), the conductive structure 130 has a size of 1.5 mm along the extension direction of the second conductive elements (the direction X in FIG. 2*a*). The antenna of such size has an operation frequency of about 28 GHz and a wavelength of an electromagnetic wave transmitted or received is 10 mm to 12 mm.

In implementations of the present disclosure, in each conductive structure 130 of the comb structure, the intensity of the electromagnetic wave decays exponentially along a pointing direction of the comb teeth (direction X in FIG. 2*a*) to form an evanescent wave, while the electromagnetic wave may propagates along an arrangement direction of the comb teeth (direction Y in FIG. 2*a*) to form a surface plasma wave (which is a kind of electromagnetic surface wave) in which the electromagnetic wave energy is bound at the tip of the comb teeth. The vector of surface plasmon wave propagating in direction Y is much larger than that in vacuum. By using this property, the size of the antenna and the device carrying the antenna can be compressed, thus realizing the fabrication of a miniaturized antenna and a miniaturized device carrying the antenna. Artificial surface plasmon structure can reduce the size of antenna by means of its own advantages. Although common metal structure can be used as antenna, the size of common metal antenna is relatively large. On the screen of mobile phones or other small electronic devices, it is necessary to minimize the size of antennas, so as to reduce the impact of antennas on display performance and touch layer performance. For example, the size of patch antenna in a frequency of 28 GHz is generally about 3 mm×3 mm, while the size of surface plasmon structure antenna can be compressed to about 1.5 mm×1.5 mm, which greatly reduces the antenna size, thus saving the space of electronic devices provided with antennas and reducing the size of electronic devices provided with antennas as much as possible.

In an exemplary implementation, the dimension W1 (the width of the first conductive line a1 and the second conductive line a2) of the first sub-conductive element 1321 (i.e., the first conductive line a1) and the second sub-conductive element 1322 (i.e., the second conductive line a2) along the second direction Y is 0.01 mm to 0.12 mm; the length L1 of the first sub-conductive element 1321 (i.e. the first conductive line a1) along the first direction X is 0.98 mm to 1.3 mm; the length L2 of the second sub-conductive element 1322 (i.e. the second conductive line a2) along the first direction X is 0.8 mm to 0.95 mm; the distance H1 between the centers of two adjacent second conductive elements 132 is 0.02 mm to 0.4 mm.

In an exemplary implementation, the antenna further includes a feeder line 133 disposed at the third side A3 or the fourth side A4 of the first conductive element 131; or, the feeder line 133 is disposed on the comb teeth at the end of the second conductive element 132, for example, the feeder line 133 is disposed on the comb teeth at both ends in the second conductive element 132 along the second direction Y, as shown in FIG. 2*d*, and the feeder line 133 may be disposed on the comb teeth at the lower end in the second conductive element 132 along the second direction Y.

In an exemplary implementation, the width W3 of the feeder line 133 is about 20 microns to 60 microns.

In an exemplary implementation, the sum of the lengths of the conductive structure 130 and the feeder line 133 along the arrangement direction of the plurality of second conductive elements 132 is 2 mm to 3.5 mm, for example, the sum of the lengths of the conductive structure 130 and the feeder line 133 along the arrangement direction of the plurality of second conductive elements 132 is 2.7 mm.

Figure 4A:
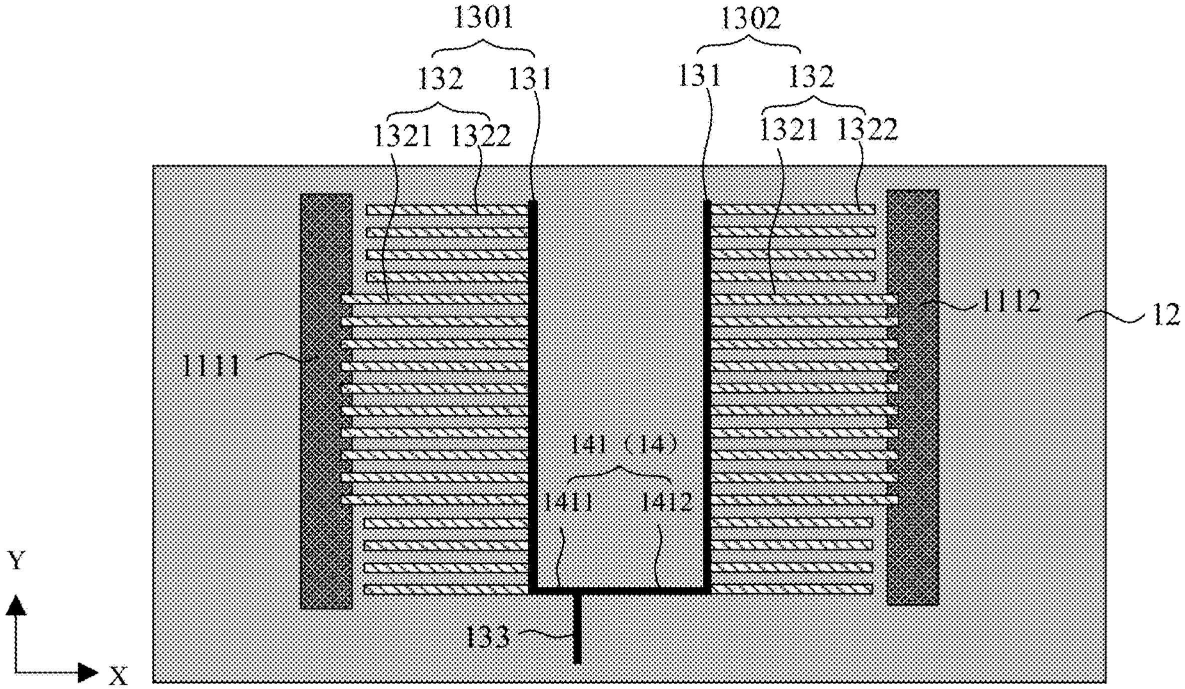
FIG. 4*a* is a schematic diagram of a planar structure of an antenna according to an exemplary implementation of the present disclosure.
Figure 4B:
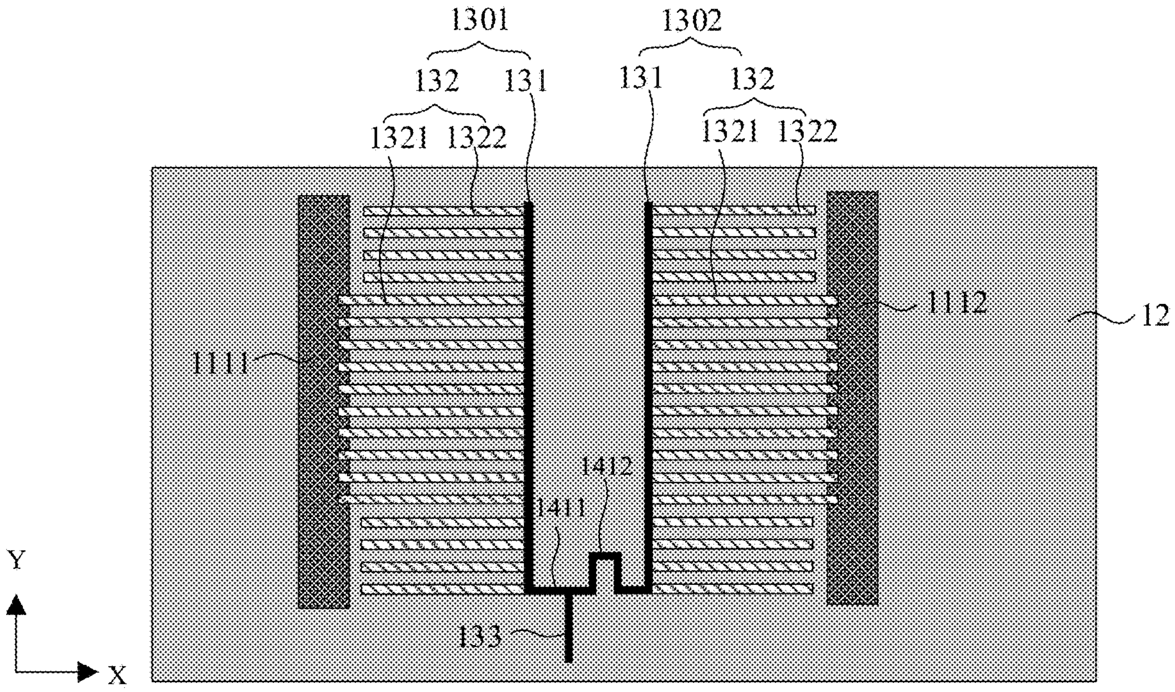
FIG. 4*b* is a schematic diagram of a planar structure of an antenna according to an exemplary implementation of the present disclosure.

In an exemplary implementation as shown in FIG. 4*a* and FIG. 4*b*, at least one slot 111 includes a first slot 1111 and a second slot 1112; at least one conductive structure 130 includes a first conductive structure 1301 and a second conductive structure 1302; the first conductive element 1321 in the first conductive structure 1301 and the first conductive element 1321 in the second conductive structure 1302 are connected.

In an exemplary implementation, in the structure shown in FIG. 4*a* and FIG. 4*b*, the arrangement direction of the plurality of second conductive elements 132 in the first conductive structure 1301 is parallel to the arrangement direction of the plurality of second conductive elements 132 in the second conductive structure 1302;

the first sub-conductive element 1321 in the first conductive structure 1301 and the first sub-conductive element 1321 in the second conductive structure 1302 are disposed symmetrically with respect to a center line of first conductive structure 1301 and the second conductive structure 1302 along the second direction (direction Y), the second sub-conductive element 1321 in the first conductive structure 1301 and the second sub-conductive element 1322 in the second conductive structure 1302 are disposed symmetrically with respect to a center line of the first conductive structure 1301 and the second conductive structure 1302 along the second direction (direction Y).

In an exemplary implementation, as shown in FIG. 4*a* to FIG. 4*d*, the antenna further includes a first connection line 141, the first conductive element 1321 in the first conductive structure 1301 and the first conductive element 1321 in the second conductive structure 1302 are arranged in parallel and connected through the first connection line 141, the first connection line 141 is disposed to connect two ends of the comb back of the first conductive structure 1301 and the comb back of the second conductive structure 1302 which are close to each other.

In an exemplary implementation, as shown in FIG. 4*a* to FIG. 4*d*, the feeder line 133 is connected with a first connection line 141, and the feeder line divides the first connection line 141 into a first sub-connection line 1411 and a second sub-connection line 1412, the first sub-connection line 1411 is located between the feeder line 133 and the first conductive structure 1301, and the second sub-connection line 1412 is located between the feeder line 133 and the second conductive structure 1302; the length of the first connection line 141 is the length of the wavelength of the electromagnetic wave transmitted or received by the antenna. In an exemplary implementation, the difference between the length of the first sub-connection line 1411 and the length of the second sub-connection line 1412 is 0.4 to 0.6 times of the length of the wavelength of the electromagnetic wave. For example, in the structure shown in FIG. 4*a* and FIG. 4*b*, the length of the first sub-connection line 1411 is smaller than the length of the second sub-connection line 1412, and the difference between the length of the first sub-connection line 1411 and the length of the second sub-connection line may be 0.5 times of the length of the wavelength of the electromagnetic wave transmitted or received by the antenna. In the structure shown in FIG. 4*c* and FIG. 4*d*, the length of the first sub-connection line 1411 may be greater than the length of the second sub-connection line 1412, and the difference between the length of the second sub-connection line 1412 and the length of the first sub-connection line 1411 may be 0.4 to 0.6 times of the length of the wavelength of the electromagnetic wave transmitted or received by the antenna. For example, the difference between the length of the second sub-connection line 1412 and the length of the first sub-connection line 1411 may be 0.5 times of the length of the wavelength of the electromagnetic wave transmitted or received by the antenna.

Figure 4C:
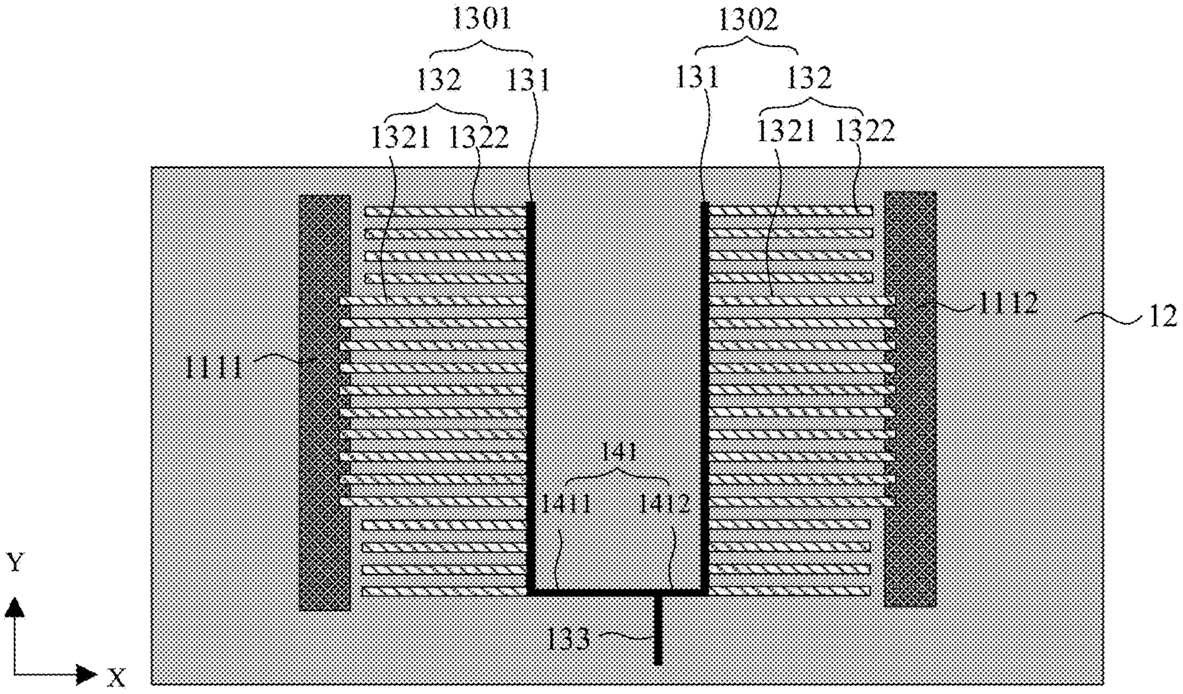
FIG. 4*c* is a schematic diagram of a planar structure of an antenna according to an exemplary implementation of the present disclosure.
Figure 4D:
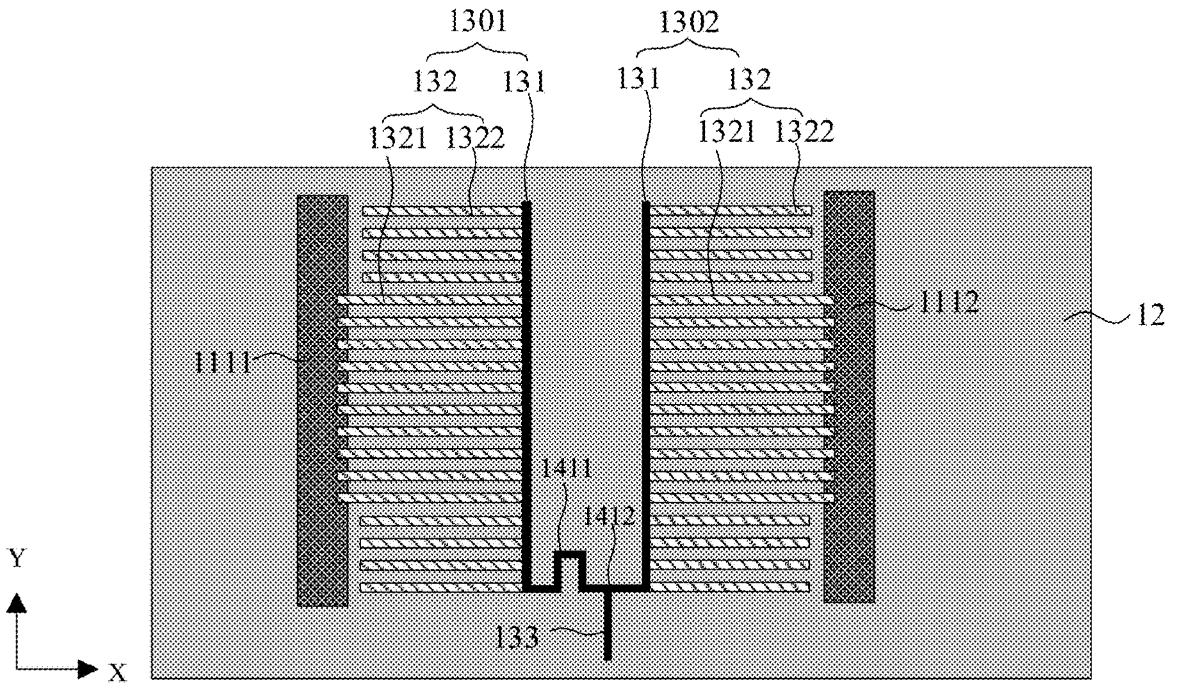
FIG. 4*d* is a schematic diagram of a planar structure of an antenna according to an exemplary implementation of the present disclosure.

In an exemplary implementation, as shown in FIG. 4*b* and FIG. 4*d*, a longer one of the first sub-connection line 1411 and the second sub-connection line 1412 is of a polygonal line type. In the implementation of the present disclosure, the distance between the first conductive structure 1301 and the second conductive structure 1302 can be reduced by setting the longer one of the first sub-connection lines 1411 and the second sub-connection lines 1412 as a polygonal line type, thereby reducing the size of the antenna.

In the structure shown in FIG. 4*a* and FIG. 4*c*, the longer one of the first sub-connection lines 1411 and the second sub-connection lines 1412 may be of a straight line type.

Figure 5A:
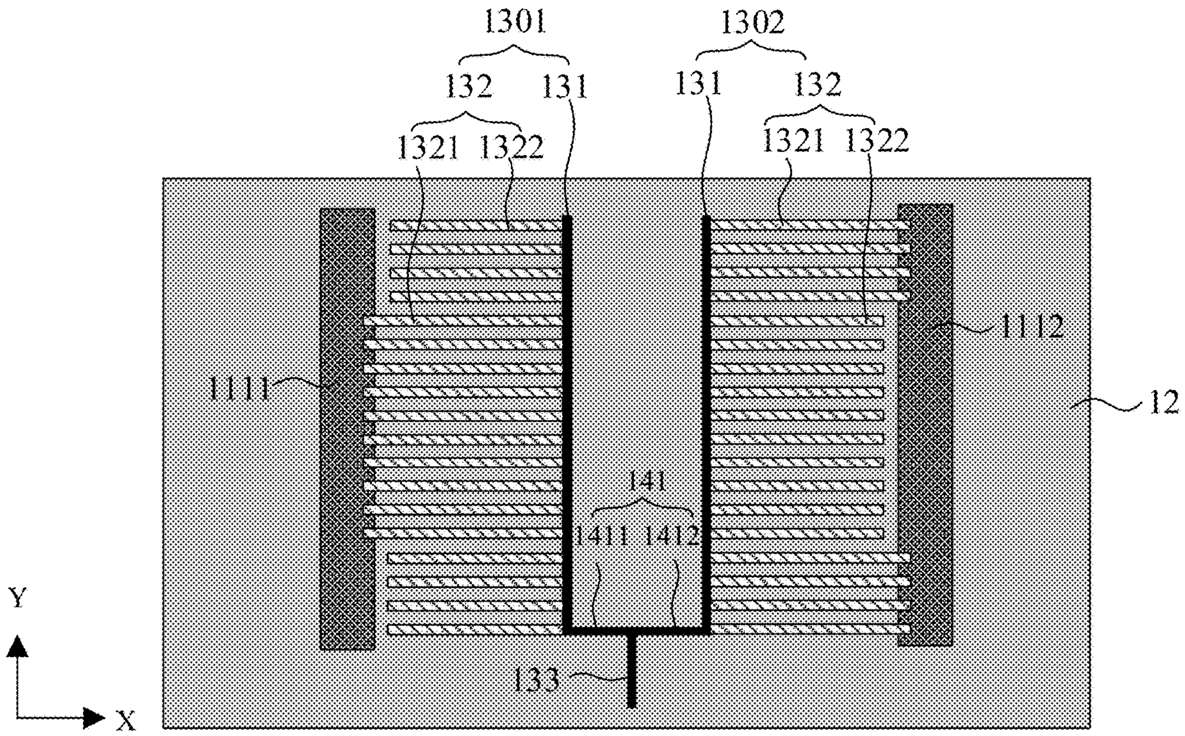
FIG. 5*a* is a schematic diagram of a planar structure of an antenna according to an exemplary implementation of the present disclosure.
Figure 5B:
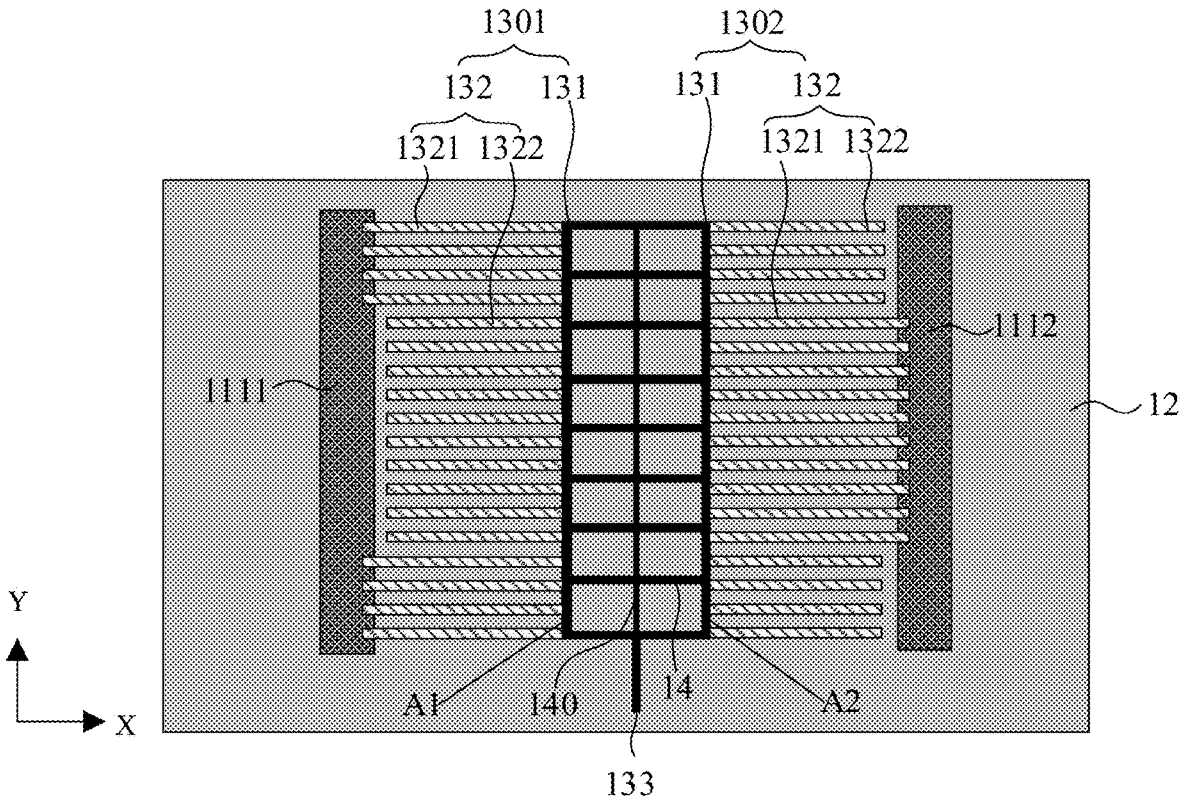
FIG. 5*b* is a schematic diagram of a planar structure of an antenna according to an exemplary implementation of the present disclosure.

In an exemplary implementation, as shown in FIG. 5*a* and FIG. 5*b*, the arrangement direction of the plurality of second conductive elements 132 in the first conductive structure 1301 is parallel to the arrangement direction of the plurality of second conductive elements 132 in the second conductive structure 1302; in the plurality of second conductive elements 132, the first sub-conductive element 1321 constitutes a long tooth of the comb structure 130, and the second sub-conductive element 1322 constitutes a short tooth of the comb structure 130;

The first sub-conductive element 1321 in the first conductive structure 1301 and a second sub-conductive element 1321 in the second conductive structure 1302 are correspondingly disposed along first direction (direction X) to form a structure a complementary structure of the long tooth and the short tooth in the first direction; the second sub-conductive element 1322 in the first conductive structure 1301 and the first sub-conductive element 1321 in the second conductive structure 1302 are correspondingly disposed along the first direction (direction X) to form a complementary structure of the long tooth and the short tooth in the first direction.

In an exemplary implementation, In the structure shown in FIG. 5*a* and FIG. 5*b*, the antenna also includes a first connection line 141, the first conductive element 1321 in the first conductive structure 1301 and the first conductive element 1321 in the second conductive structure 1302 are arranged in parallel and connected through the first connection line 141, the first connection line 141 is disposed to connect two ends of the comb back of the first conductive structure 1301 and the comb back of the second conductive structure 1302 which are close to each other.

In an exemplary implementation, as shown in FIG. 5*a*, the feeder line 133 is connected with the first connection line 141, the feeder line 133 divides the first connection line 141 into a first sub-connection line 1411 located between the feeder line 133 and the first conductive structure 1301 and a second sub-connection line 1412 located between the feeder line 133 and the second conductive structure 1302; the length of the first connection line 141 may be the length of the wavelength of the electromagnetic wave transmitted or received by the antenna and the length of the first sub-connection line 1411 may be equal to the length of the second sub-connection line 1412.

In an exemplary implementation, as shown in FIG. 5*b*, the first conductive element 1321 in the first conductive structure 1301 and the first conductive element 1321 in the second conductive structure 1302 are the same conductive element; the second conductive element 1322 of the first conductive structure 1301 is located at the first side A1 of the first conductive element 1321, and the second conductive element 1322 of the second conductive structure 1322 is located at the second side A2 of the first conductive element. In the structure shown in FIG. 5*b*, the first conductive element 1321 in the first conductive structure 1301 and the first conductive element 1321 in the second conductive structure 1302 are the same conductive element, which can reduce the size of the antenna.

In an exemplary implementation of the present disclosure, as shown in FIG. 5*b*, the antenna may further include at least one bridge connection line 140 connecting the plurality of connection lines 14, and the at least one bridge connection line 140 and the plurality of connection lines 14 form a grid structure.

Figure 6A:
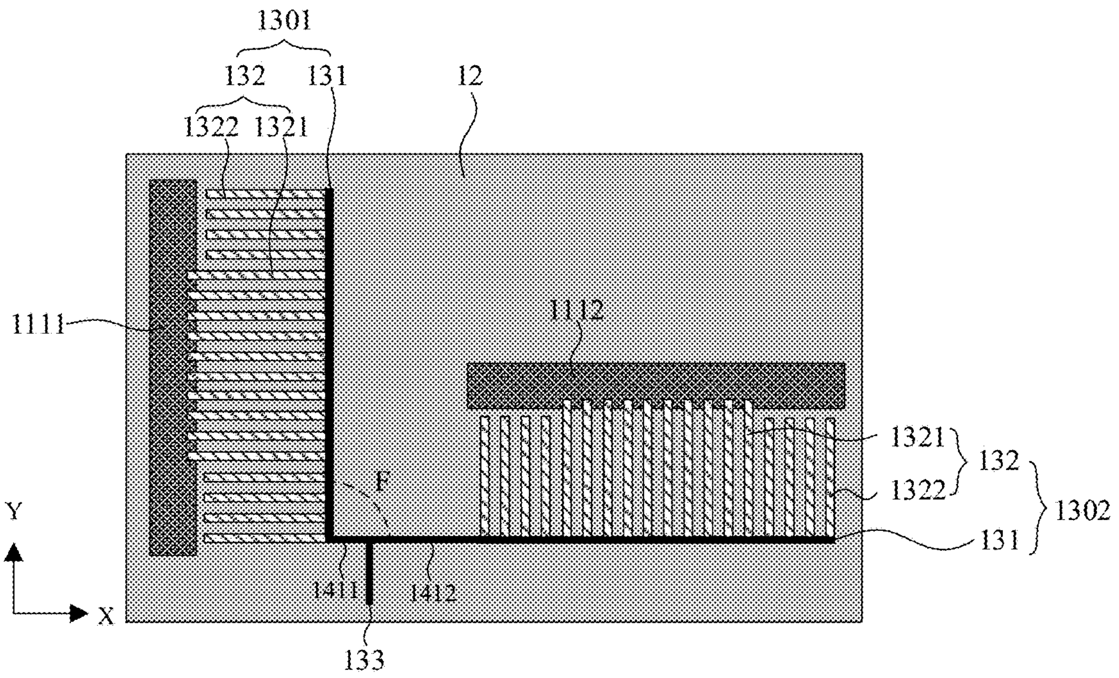
FIG. 6*a* is a schematic diagram of a planar structure of an antenna according to an exemplary implementation of the present disclosure.
Figure 6B:
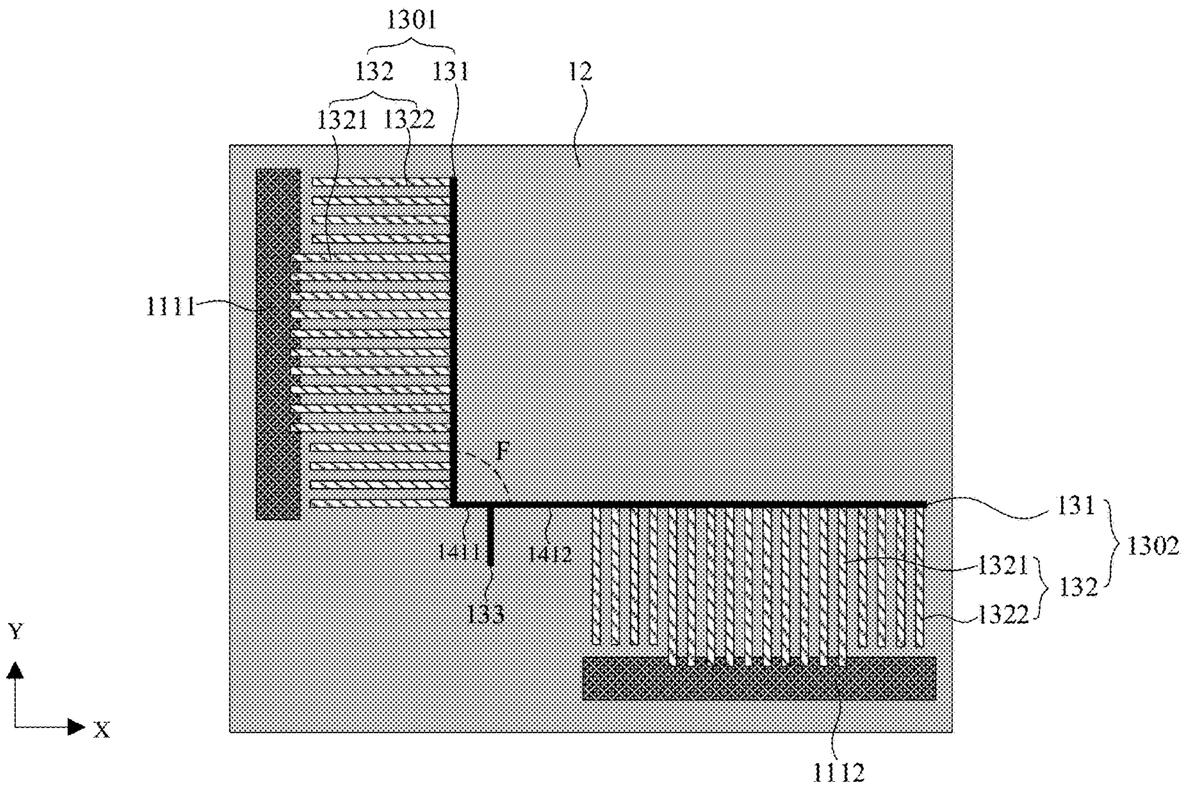
FIG. 6*b* is a schematic diagram of a planar structure of an antenna according to an exemplary implementation of the present disclosure.

In an exemplary implementation, as shown in FIG. 6*a* to FIG. 6*b*, an included angle between the first conductive element 1321 in the first conductive structure 1301 and the first conductive element 1321 in the second conductive structure 1302 is greater than 0 degree and less than 180 degrees. The arrangement direction of the plurality of second conductive elements 132 in the first conductive structure 1301 and the arrangement direction of the plurality of second conductive elements 132 in the second conductive structure 1302 have a first included angle F1, or the first conductive element 1321 in the first conductive structure 1301 and the first conductive element 1321 in the second conductive structure 1302 have a first included angle F1. The first included angle F1 is greater than 0 degree and less than 180 degrees. For example, the first included angle F1 may be 30°, 60°, 90° or 120°.

Figure 6C:
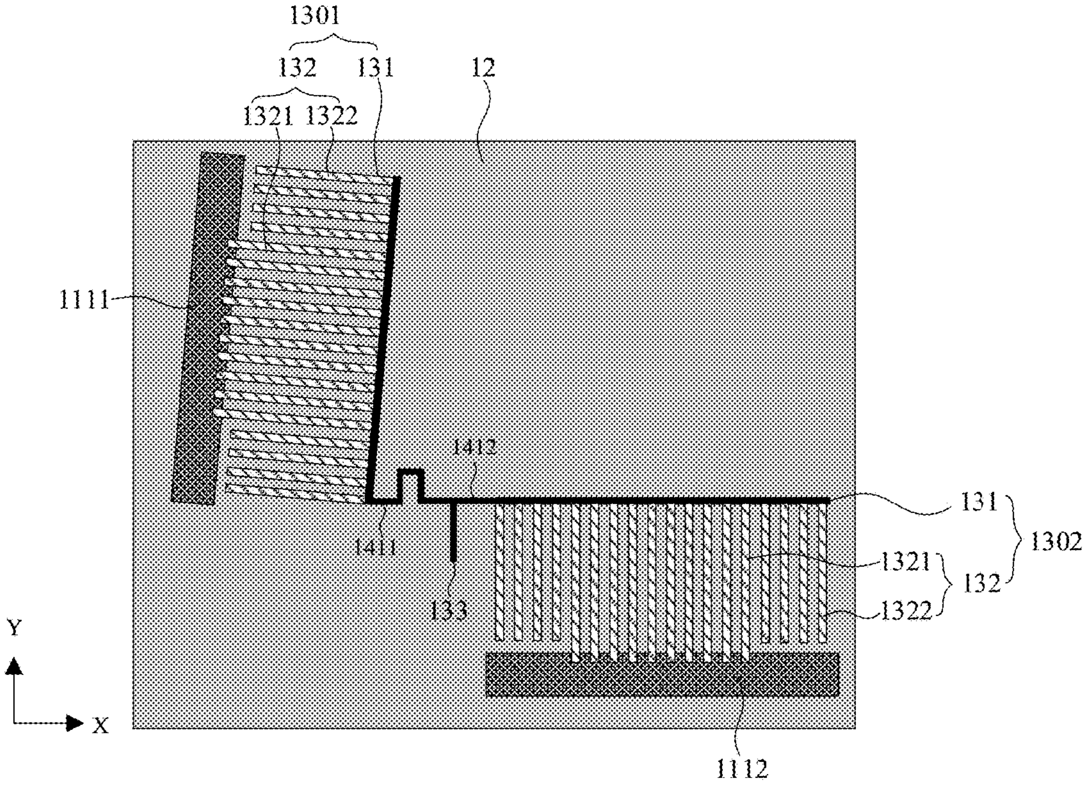
FIG. 6*c* is a schematic diagram of a planar structure of an antenna according to an exemplary implementation of the present disclosure.

In an exemplary implementation, in the structure as shown in FIG. 6*a* to FIG. 6*c*, the antenna further includes a first connection line 141, the first conductive element 1321 in the first conductive structure 1301 and the first conductive element 1321 in the second conductive structure 1302 are connected through the first connection line 141, the first connection line 141 is disposed to connect two ends of the comb back of the first conductive structure 1301 and the comb back of the second conductive structure 1302 which are close to each other.

In an exemplary implementation, the feeder line 133 is disposed on the first connection line 141, the feeder line 133 divides the first connection line 141 into a first sub-connection line 1411 located between the feeder line 133 and the first conductive structure 1301 and a second sub-connection line 1412 located between the feeder line 133 and the second conductive structure 1302, the length of the first connection line 141 is the length of the wavelength of the electromagnetic wave transmitted or received by the antenna and the length of the first sub-connection line 1411 may be equal to the length of the second sub-connection line 1412. For example, in the structure shown in FIG. 6*a* and FIG. 6*b*, the length of the first sub-connection line 1411 is smaller than the length of the second sub-connection line 1412, and the difference between the length of the first sub-connection line 1411 and the length of the second sub-connection line may be 0.5 times of the length of the wavelength of the electromagnetic wave transmitted or received by the antenna. In the structure shown in FIG. 6*c*, the length of the first sub-connection line 1411 is greater than the length of the second sub-connection line 1412, and the difference between the length of the first sub-connection line 1411 and the length of the second sub-connection line may be 0.5 times of the length of the wavelength of the electromagnetic wave transmitted or received by the antenna. In the exemplary implementation, the longer one of the first sub-connection lines 1411 and the second sub-connection lines 1412 is of the polygonal type. As shown in FIG. 6*c*, setting the first sub-connection line 1411 as the polygonal type can reduce the distance between the first conductive structure 1301 and the second conductive structure 1302, thereby reducing the size of the antenna.

Figure 6D:
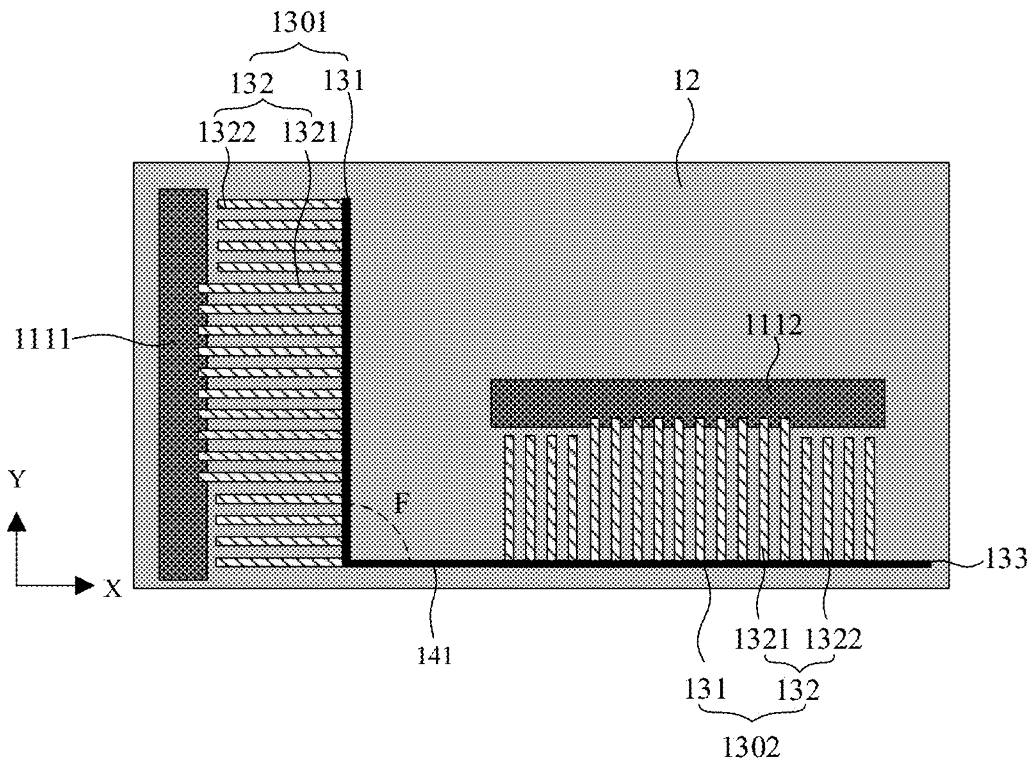
FIG. 6*d* is a schematic diagram of a planar structure of an antenna according to an exemplary implementation of the present disclosure.
Figure 6E:
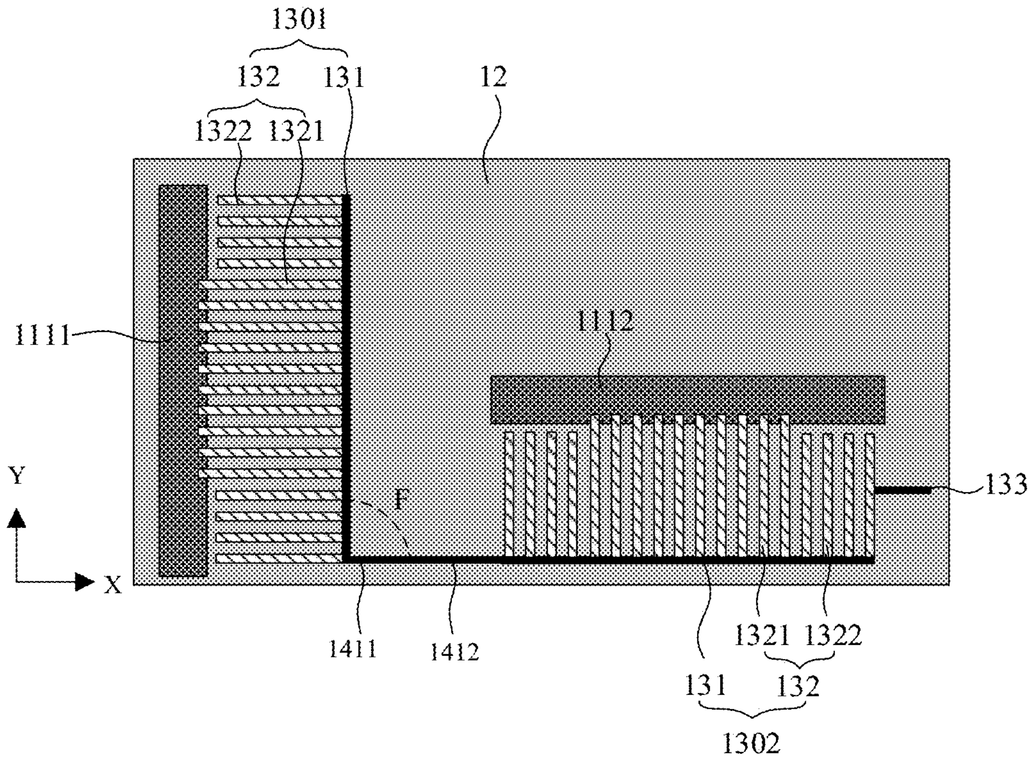
FIG. 6*e* is a schematic diagram of a planar structure of an antenna according to an exemplary implementation of the present disclosure.

In another exemplary implementation, as shown in FIG. 6*d* and FIG. 6*e*, the feeder line 133 is disposed at an end of the second conductive structure 1302 away from the first conductive structure 1301, or, the feeder line 133 is disposed at an end of the first conductive structure 1301 away from the second conductive structure 1302, and the length of the first connection line 141 is 0.7 to 0.8 times of the length of the wavelength of the electromagnetic wave transmitted or received by the antenna. In the structure shown in FIG. 6*d*, the feeder line 133 is disposed on the comb back of the end of the second conductive structure 1302 away from the first conductive structure 1301, and in the structure shown in FIG. 6*e*, the feeder line 133 is disposed on the comb teeth of the end of the second conductive structure 1302 away from the first conductive structure 1301.

Figure 6F:
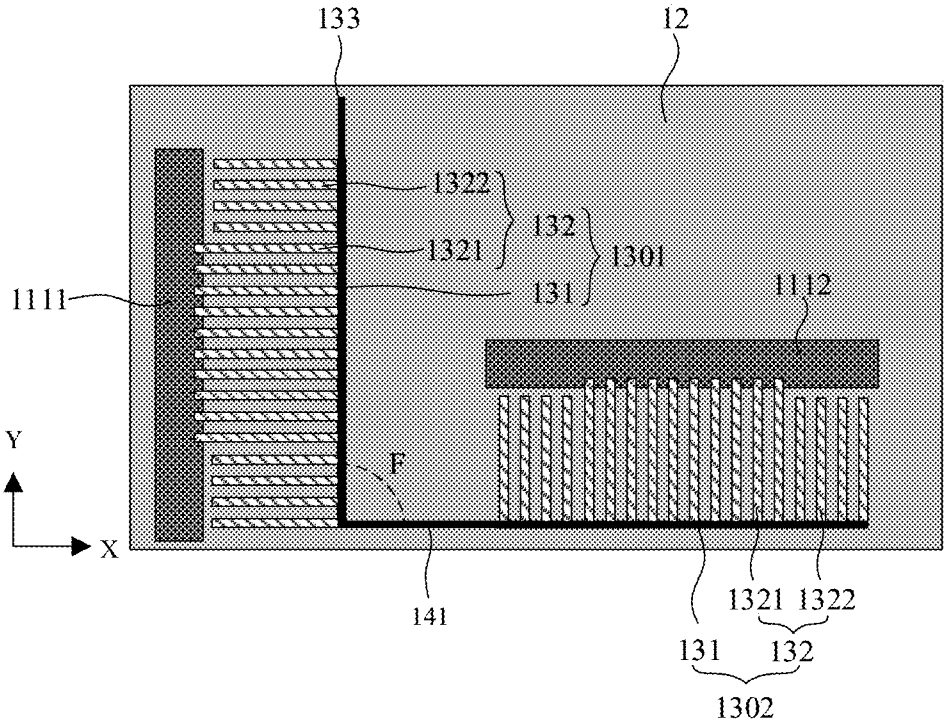
FIG. 6*f* is a schematic diagram of a planar structure of an antenna according to an exemplary implementation of the present disclosure.
Figure 6G:
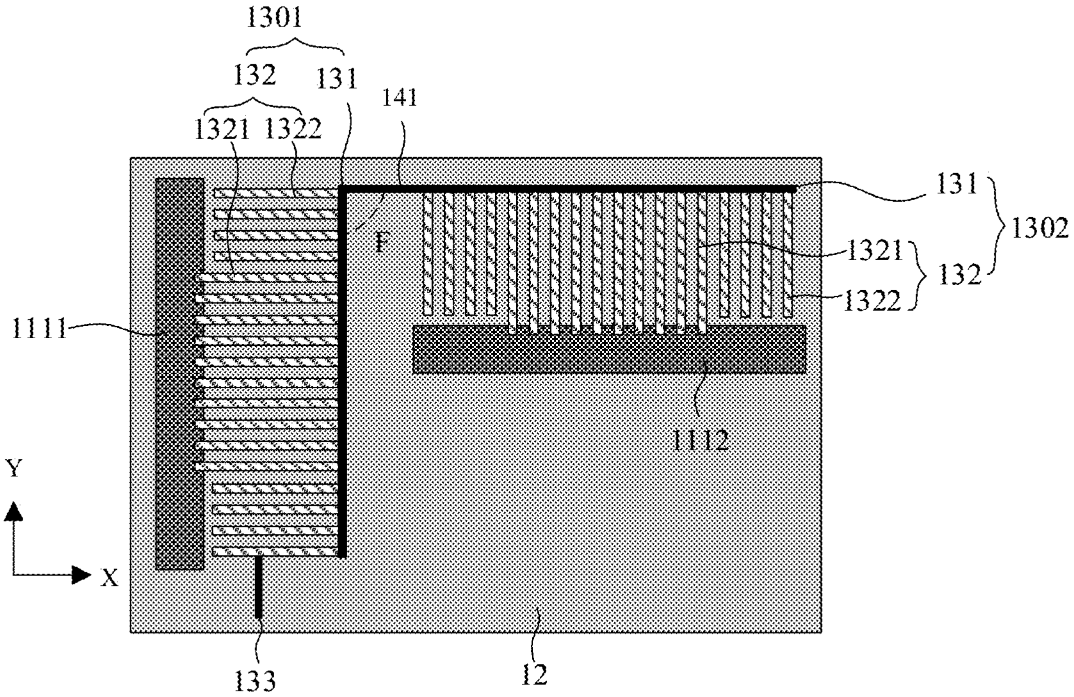
FIG. 6*g* is a schematic diagram of a planar structure of an antenna according to an exemplary implementation of the present disclosure.

In another exemplary implementation, as shown in FIG. 6*f* and FIG. 6*g*, the feeder line 133 is disposed at an end of the first conductive structure 1301 away from the second conductive structure 1302, and the length of the first connection line 141 is 0.7 to 0.8 times of the length of the wavelength of the electromagnetic wave transmitted or received by the antenna. In the structure shown in FIG. 6*f*, the feeder line 133 is disposed on the comb back of the end of the first conductive structure 1301 away from the second conductive structure 1302, and in the structure shown in FIG. 6*g*, the feeder line 133 is disposed on the comb teeth of the end of the first conductive structure 1301 away from the second conductive structure 1302.

In implementations of the present disclosure, in the structure shown in FIG. 6*d*-FIG. 6*g*, in an antenna structure of an artificial surface plasmon structure having a size of 1.5 mm*1.5 mm for each comb-shaped conductive structure 130 and an operating frequency of 28 GHz, the wavelength of the electromagnetic wave transmitted or received by the antenna is 10 mm to 12 mm, and the length of the first connection line 141 is 0.7 to 0.8 times of the length of the wavelength of the electromagnetic wave transmitted or received by the antenna, for example, the length of the first connection line 141 may be 0.75 times of the length of the wavelength of the electromagnetic wave transmitted or received by the antenna.

In the implementation of the present disclosure, in the antenna structure shown in FIG. 6*a*-FIG. 6*g*, circularly polarized radiation may be formed.

Figure 7A:
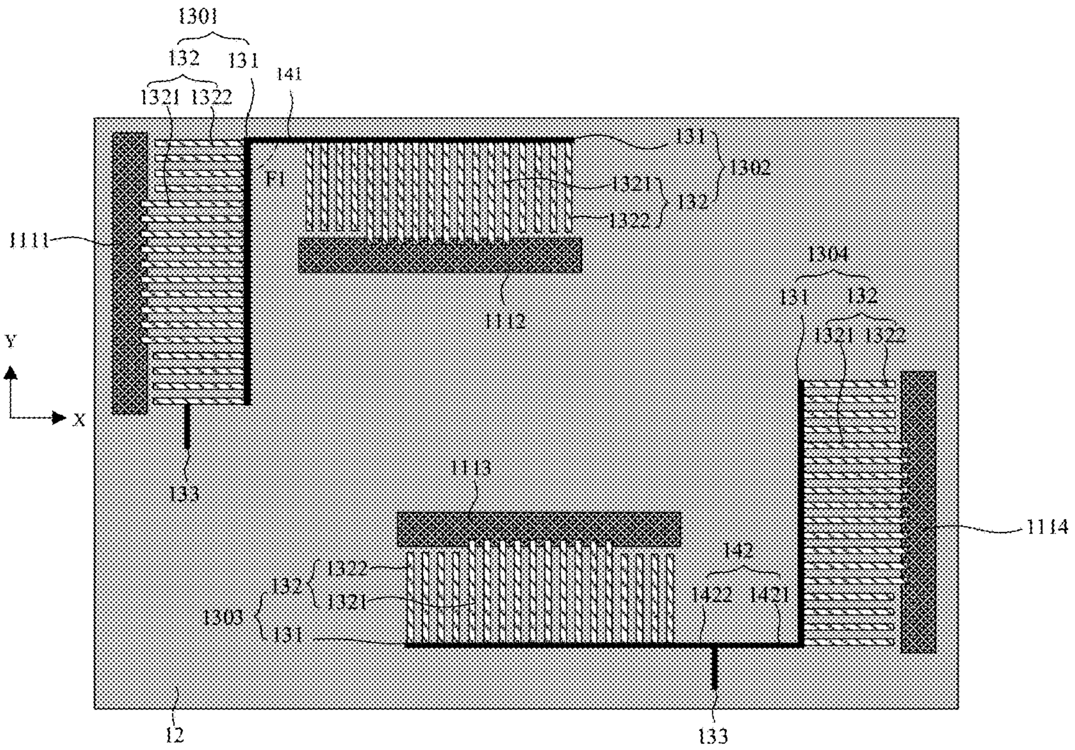
FIG. 7*a* is a schematic diagram of a planar structure of an antenna according to an exemplary implementation of the present disclosure.
Figure 7B:
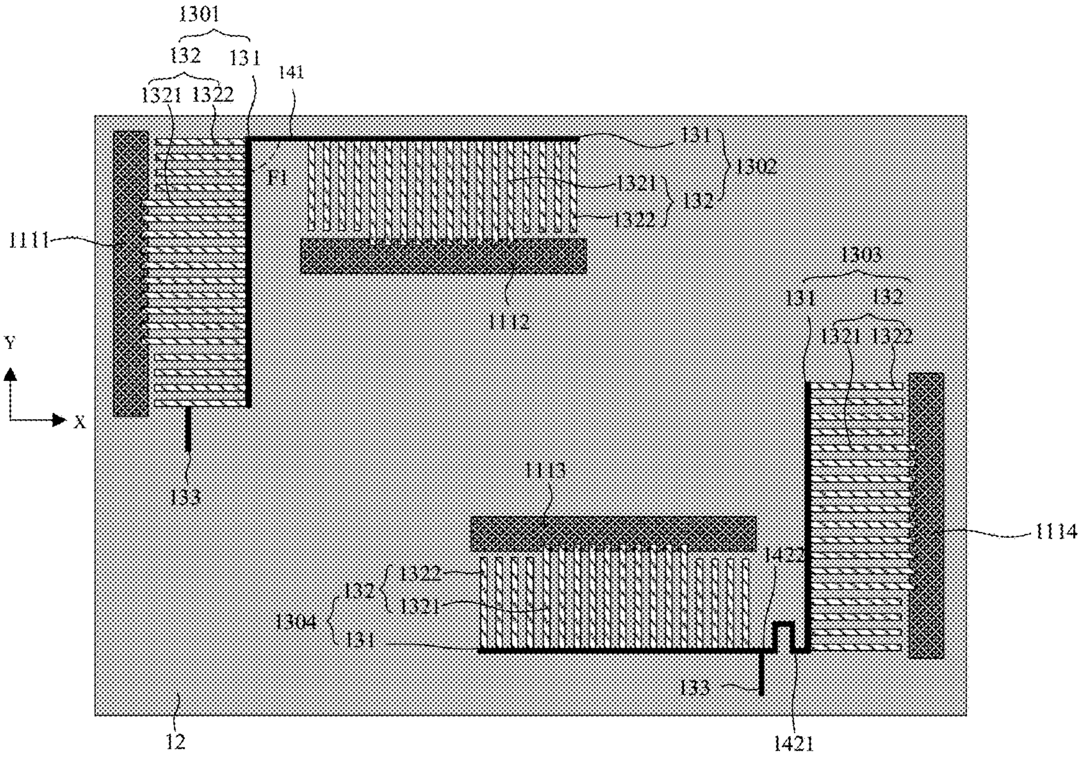
FIG. 7*b* is a schematic diagram of a planar structure of an antenna according to an exemplary implementation of the present disclosure.
Figure 7C:
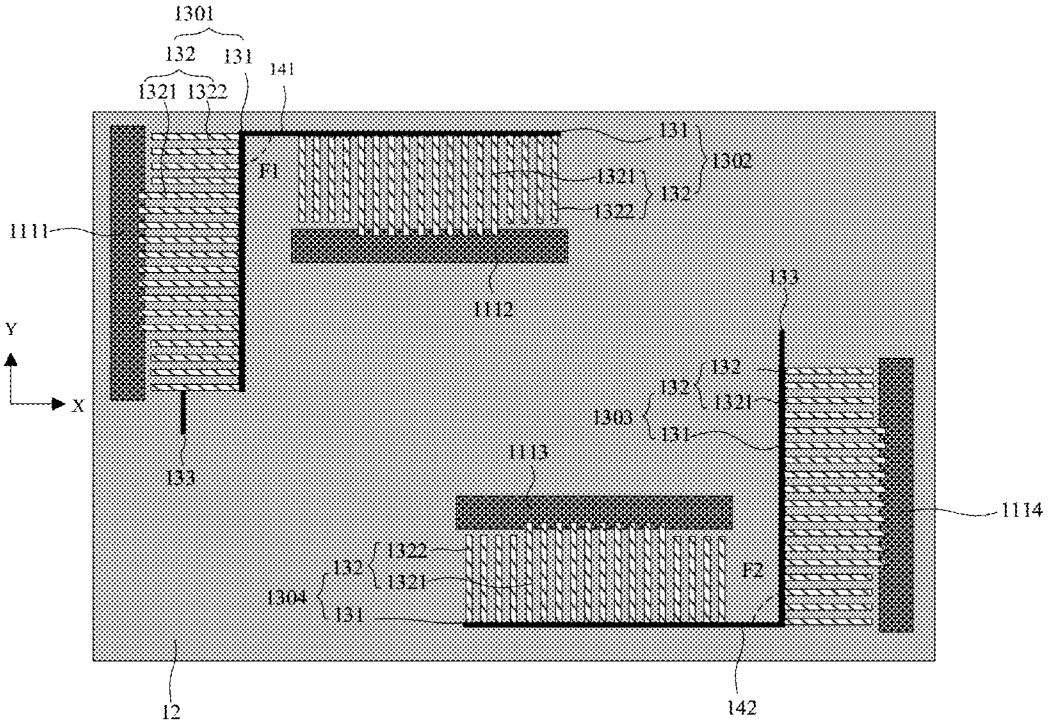
FIG. 7*c* is a schematic diagram of a planar structure of an antenna according to an exemplary implementation of the present disclosure.

In an exemplary implementation, as shown in FIG. 7*a*-FIG. 7*c*, the at least one slot further includes a third slot 1113 and a fourth slot 1114; at least one conductive structure 130 of the comb structure further includes a third conductive structure 1303 and a fourth conductive structure 1304;

the first conductive element 131 in the third conductive structure 1303 and the first conductive element 131 in the fourth conductive structure 1304 are connected through at least one connection line; the at least one connection line includes a second connection line 142 disposed to connect two ends of the comb back of the third conductive structure 1303 and the comb back of the fourth conductive structure 1304 which are close to each other.

In the structure shown in FIG. 7*a*-FIG. 7*b*, the antenna also includes the feeder line 133, the feeder line 133 is disposed on the second connection line 142, the feeder line 133 divides the second connection line 142 into a first sub-connection line 1421 and a second sub-connection line 1422, the first sub-connection line 1421 is located between the feeder line 133 and the third conductive structure 1303, the second sub-connection line 1422 is located between the feeder line 133 and the fourth conductive structure 1304, the length of the second connection line 142 is the length of the wavelength of the electromagnetic wave transmitted or received by the antenna, and a difference between the length of the first sub-connection line 1421 and the length of the second sub-connection line 1422 is 0.4 to 0.6 times of the length of the wavelength of the electromagnetic wave. For example, in the structure shown in FIG. 7*a* and FIG. 7*b*, the length of the first sub-connection line 1421 is smaller than the length of the second sub-connection line 1422, and the difference between the length of the first sub-connection line 1422 and the length of the second sub-connection line may be 0.5 times of the length of the wavelength of the electromagnetic wave transmitted or received by the antenna. As shown in FIG. 7*b*, setting the first sub-connection line 1421 as a polygonal line type can reduce the distance between the first conductive structure 1301 and the second conductive structure 1302, thereby reducing the size of the antenna.

In the structure shown in FIG. 7*c*, the feeder line 133 is disposed at an end of the fourth conductive structure 1304 away from the third conductive structure 1303, and the length of the second connection line 142 is 0.7 times to 0.8 times of the length of the wavelength of the electromagnetic wave transmitted or received by the antenna. In an antenna structure of an artificial surface plasmon structure having a size of 1.5 mm*1.5 mm for each comb-shaped conductive structure 130 and an operating frequency of 28 GHz, the wavelength of the electromagnetic wave transmitted or received by the antenna is 10 mm to 12 mm, and the length of the second connection line 142 is 0.7 to 0.8 times of the length of the wavelength of the electromagnetic wave transmitted or received by the antenna, for example, the length of the second connection line 142 may be 0.75 times of the length of the wavelength of the electromagnetic wave transmitted or received by the antenna.

Figure 7D:
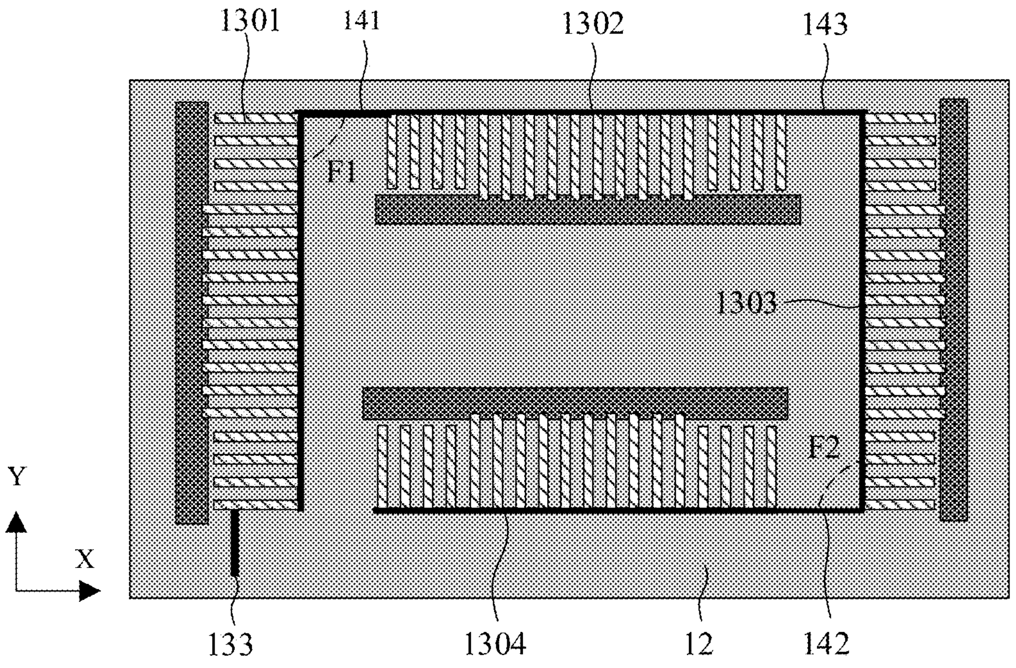
FIG. 7*d* is a schematic diagram of a planar structure of an antenna according to an exemplary implementation of the present disclosure.
Figure 7E:
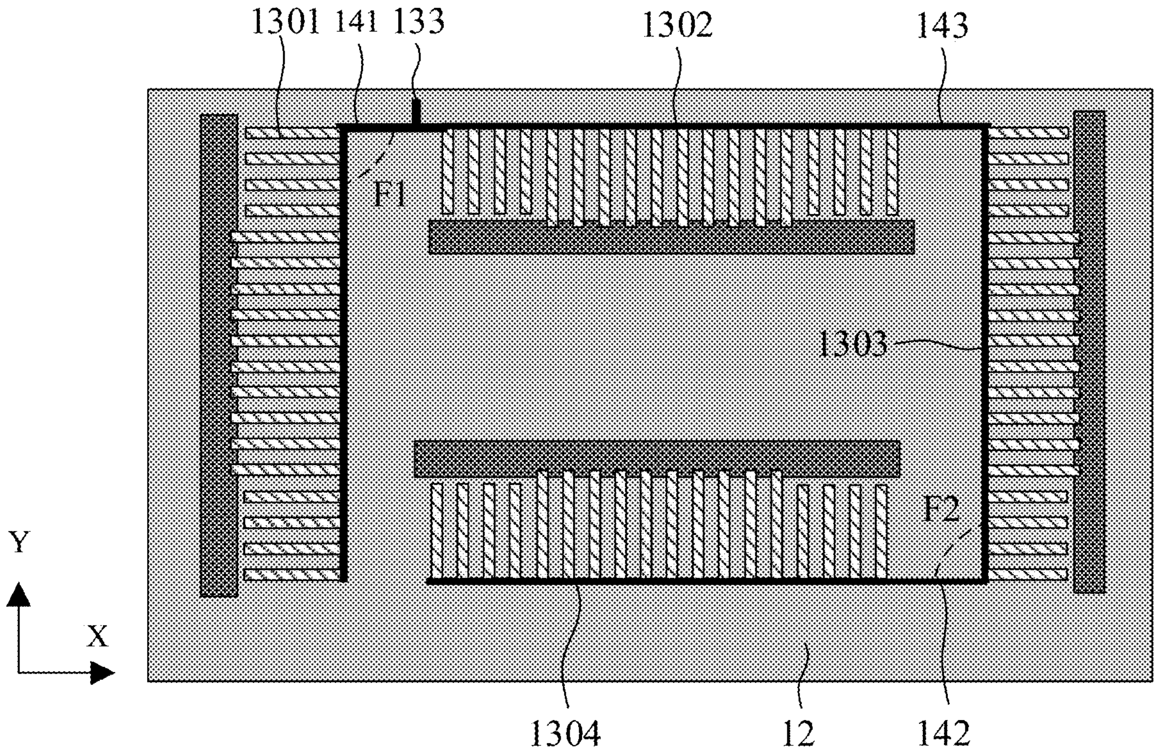
FIG. 7*e* is a schematic diagram of a planar structure of an antenna according to an exemplary implementation of the present disclosure.

In an exemplary implementation, as shown in FIG. 7*d*, the first conductive element 131 in the second conductive structure 1302 and the first conductive element 131 in the third conductive structure are connected through at least one connection line; the at least one connection line includes a third connection line 143 disposed to connect two ends of the comb back of the second conductive structure 1302 and the comb back of the third conductive structure 1303 which are close to each other.

Figure 7F:
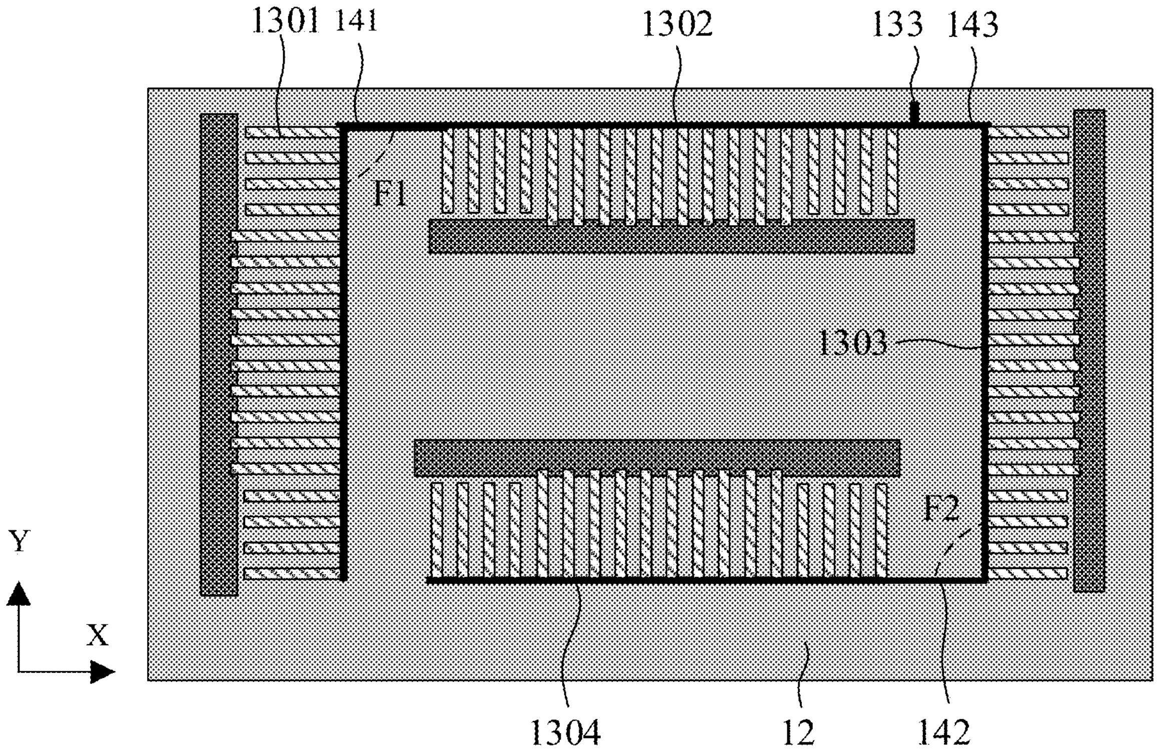
FIG. 7*f* is a schematic diagram of a planar structure of an antenna according to an exemplary implementation of the present disclosure.
Figure 7G:
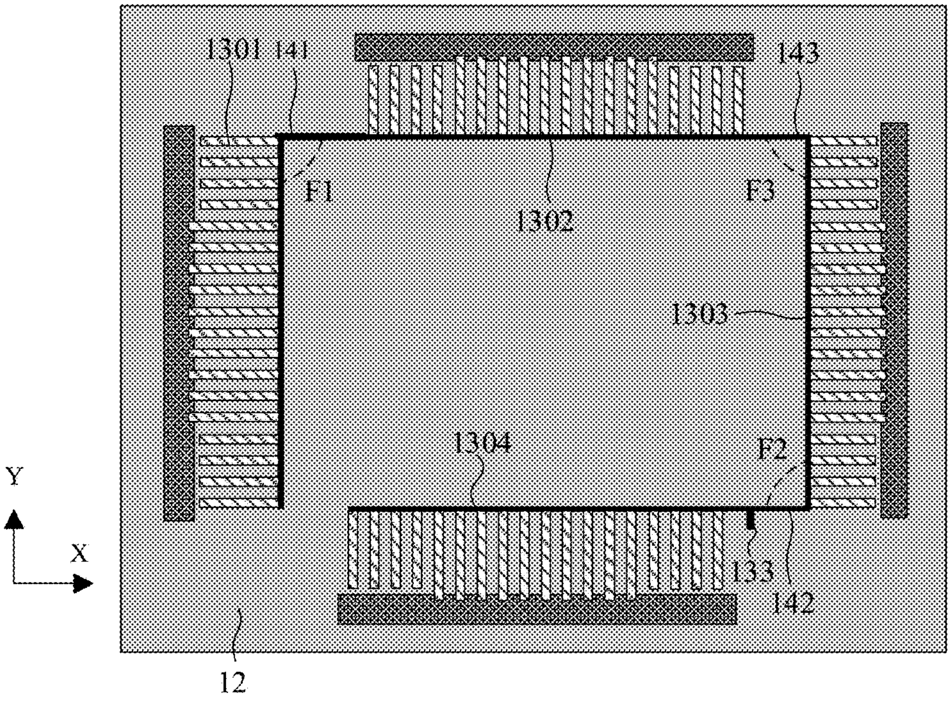
FIG. 7*g* is a schematic diagram of a planar structure of an antenna according to an exemplary implementation of the present disclosure.

In an exemplary implementation, as shown in FIG. 7*f* and FIG. 7*g*, the feeder line 133 may be disposed on the second connection line 142 or the third connection line 143 depending on the actual situation. The arrangement direction of the second conductive elements 132 in the third conductive structure 1303 and the arrangement direction of the second conductive elements 132 in the second conductive structure 1302 may have a third included angle F3. The third included angle F3 may be set according to the actual situation and is not limited in the present disclosure.

In an exemplary implementation, the arrangement direction of the plurality of second conductive elements in the third conductive structure 1303 and the arrangement direction of the plurality of second conductive elements in the fourth conductive structure have a second included angle F2, and the second included angle F2 is greater than 0 degree and less than 180 degrees. In the structure shown in FIG. 7*a*-FIG. 7*g*, the third included angle F3, the second included angle F2, and the first included angle F1 can be set to 90 degrees.

Figure 8A:
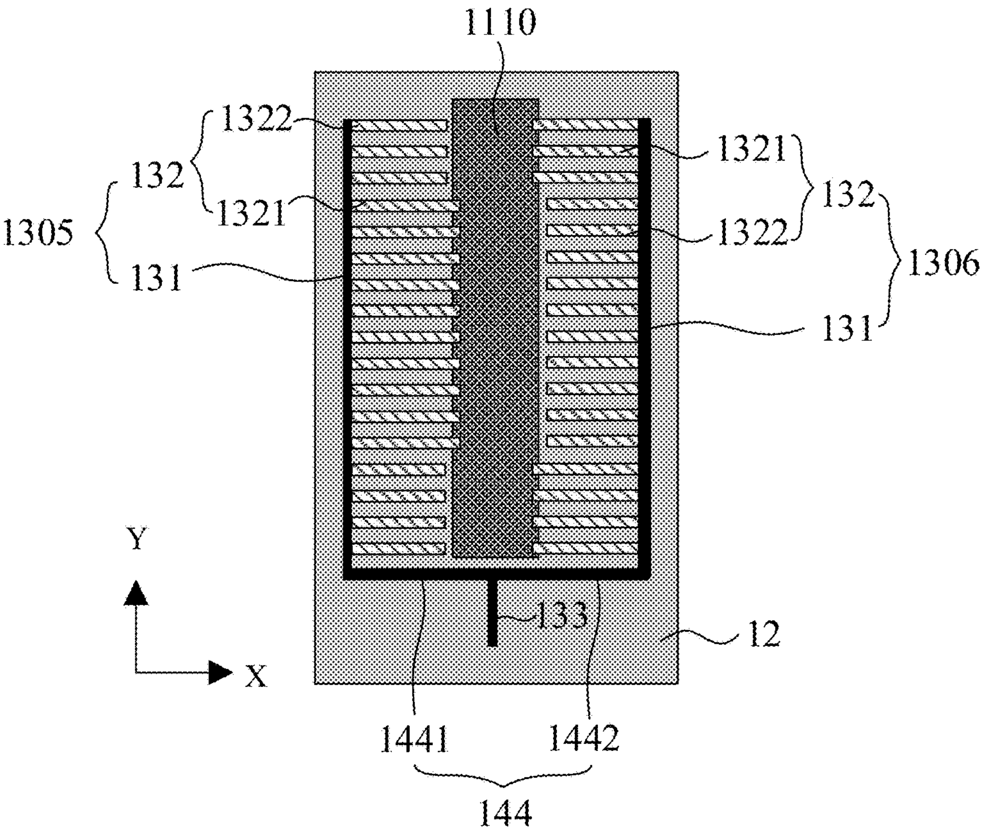
FIG. 8*a* is a schematic diagram of a planar structure of an antenna according to an exemplary implementation of the present disclosure.
Figure 8B:
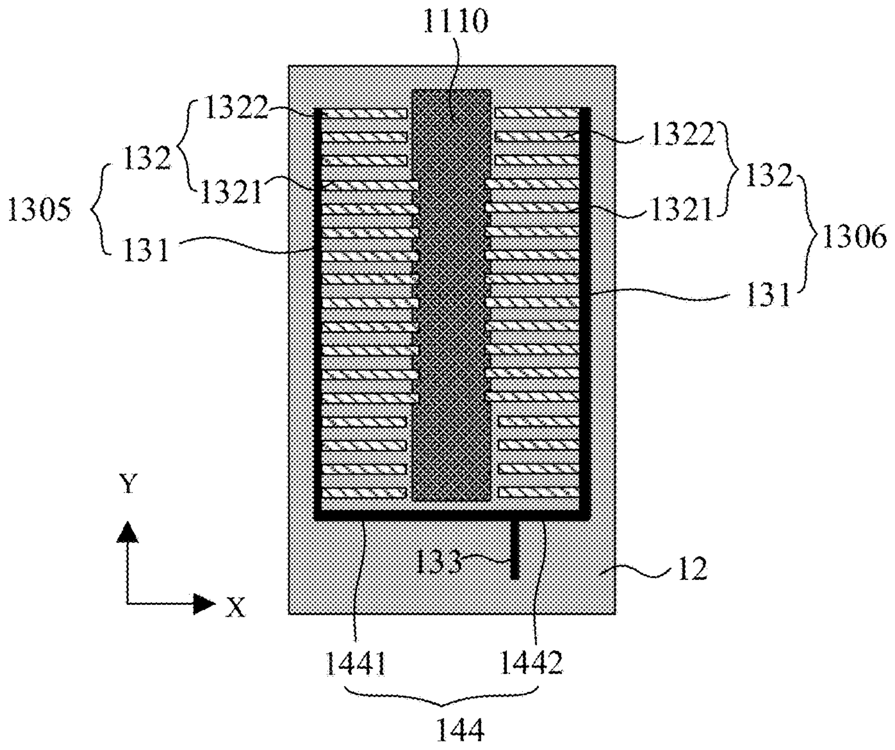
FIG. 8*b* is a schematic diagram of a planar structure of an antenna according to an exemplary implementation of the present disclosure.
Figure 8C:
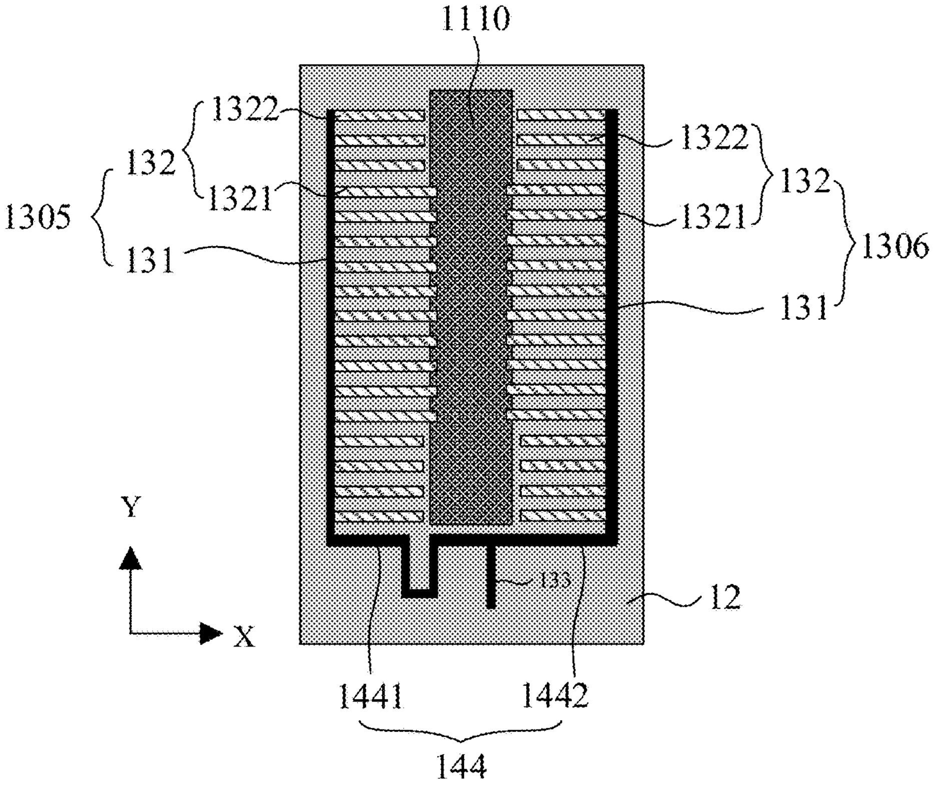
FIG. 8*c* is a schematic diagram of a planar structure of an antenna according to an exemplary implementation of the present disclosure.

In an exemplary implementation, as shown in FIG. 8*a*-FIG. 8*c*, at least one slot includes a common slot 1110, at least one conductive structure of the comb structure 130 includes a fifth conductive structure 1305 and a sixth conductive structure 1306, and the arrangement direction of a plurality of second conductive elements 132 in the fifth conductive structure 1305 is parallel to the arrangement direction of a plurality of second conductive elements 132 in the sixth conductive structure 1306;

the first conductive element 1321 in the fifth conductive junction 1305 is connected with the first conductive element 1321 in the sixth conductive structure 1306;

an orthographic projection of the common slot 1110 on the dielectric layer 12 is between an orthographic projection of the fifth conductive structure 1305 and the sixth conductive structure 1306 on the dielectric layer;

an orthographic projection of the second ends of the first sub-conductive element 1321 in the fifth conductive structure 1305 and the sixth conductive structure 1306 on the dielectric layer 12 is within the range of the orthographic projection of the common slot 1110 on the dielectric layer 12.

In an exemplary implementation, as shown in FIG. 8*a*, in the plurality of second conductive elements 132, the first sub-conductive element 1321 constitutes a long tooth of a comb structure and the second sub-conductive element 1322 constitutes a short tooth of a comb structure; the first sub-conductive element 1321 in the fifth conductive structure 1305 and the second sub-conductive element 1322 in the sixth conductive structure 1306 are correspondingly disposed along the first direction X to form a complementary structure of the long tooth and the short tooth in the first direction; the second sub-conductive element 1322 in the fifth conductive structure 1305 and the first sub-conductive element 1321 in the sixth conductive structure 1306 are correspondingly disposed along the first direction X to form a complementary structure of the long tooth and the short tooth in the first direction.

In an exemplary implementation, in the structure as shown in FIG. 8*a*, the antenna further includes a fourth connection line 144, the first conductive element 1321 in the fifth conductive structure 1305 and the first conductive element 1321 in the sixth conductive structure 1306 are connected through the fourth connection line 144, the fourth connection line 144 is disposed to connect two ends of the comb back of the fifth conductive structure 1305 and the comb back of the sixth conductive structure which are close to each other;

In the structure shown in FIG. 8*a*, the feeder line 133 may be connected with the fourth connection line 144, and the feeder line 133 divides the fourth connection line 144 into a first sub-connection line 1441 and a second sub-connection line 1442, the first sub-connection line 1441 is located between the connecting feeder line 133 and the fifth conductive structure 1305, the second sub-connection line 1442 is located between the connection feeder line 133 and the sixth conductive structure 1306.

In the structure shown in FIG. 8*a*, the length of the fourth connection line 144 is the length of the wavelength of the electromagnetic wave transmitted or received by the antenna and the length of the first sub-connection line 1441 may be equal to the length of the second sub-connection line 1442.

In an exemplary implementation, as shown in FIG. 8*b* and FIG. 8*c*, the first sub-conductive element 1321 in the fifth conductive structure 1305 and the first sub-conductive element 1321 in the sixth conductive structure 1306 are disposed symmetrically with respect to the center line of the fifth conductive structure 1305 and the sixth conductive structure 1306 along the second direction Y, the second sub-conductive element 1321 in the fifth conductive structure 1305 and the second sub-conductive element 1322 in the sixth conductive structure 1306 are disposed symmetrically with respect to the center line of the fifth conductive structure 1305 and the sixth conductive structure 1306 along the second direction Y.

In the structure shown in FIG. 8*b* and FIG. 8*c*, the fourth connection line 144 is divided into a first sub-connection line 1441 located between the connecting feeder line 133 and the fifth conductive structure 1305 and a second sub-connection line 1442 located between the connecting feeder line 133 and the sixth conductive structure 1306.

In the structure shown in FIG. 8*b* and FIG. 8*c*, the length of the fourth connection line 144 is the length of the wavelength of the electromagnetic wave transmitted or received by the antenna, and the difference between the length of the first sub-connection line 1441 and the length of the second sub-connection line 1442 is 0.4 to 0.6 times of the length of the wavelength of the electromagnetic wave. In the structure shown in FIG. 8*c*, the length of the first sub-connection line 1441 is greater than the length of the second sub-connection line 1442, and the first sub-connection line 1441 is provided as a polygonal type, so that the distance between the fifth conductive structure 1305 and the sixth conductive structure 1306 can be reduced, thereby reducing the size of the antenna.

Figure 9:
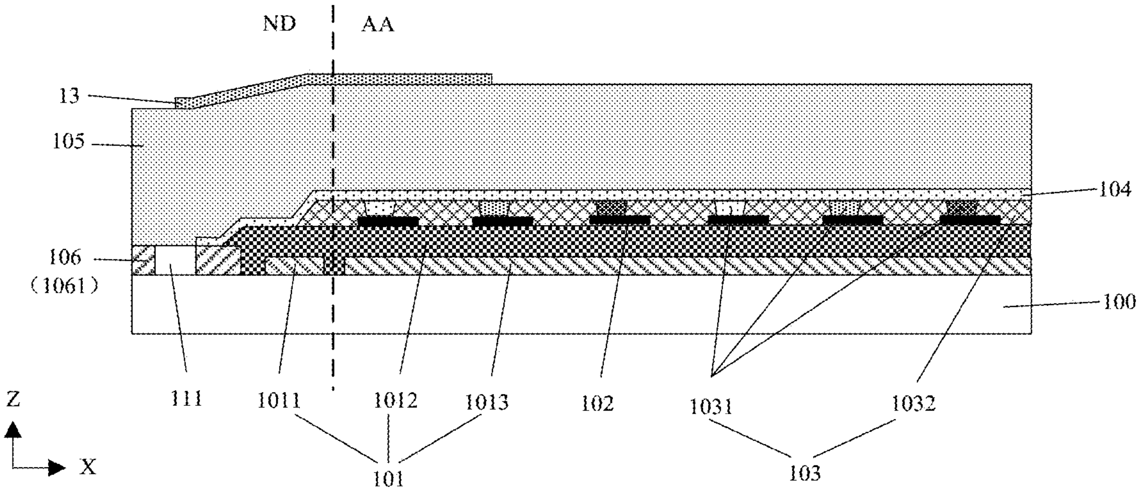
FIG. 9 is a schematic diagram of a sectional structure of a display substrate according to an exemplary implementation of the present disclosure.
Figure 10:
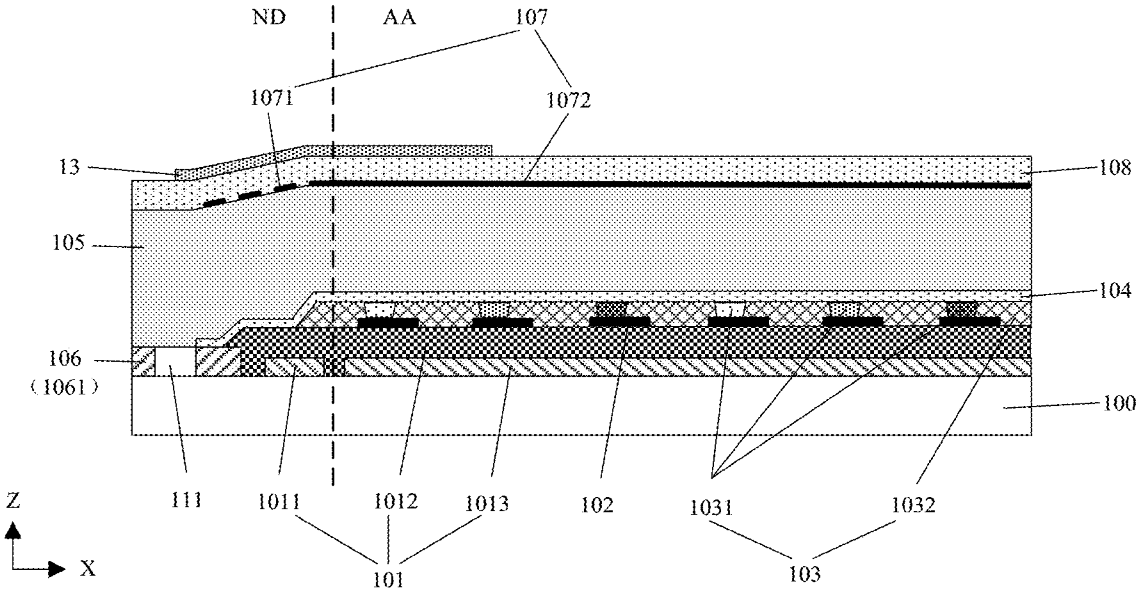
FIG. 10 is a schematic diagram of a sectional structure of a display substrate according to an exemplary implementation of the present disclosure.
Figure 11:
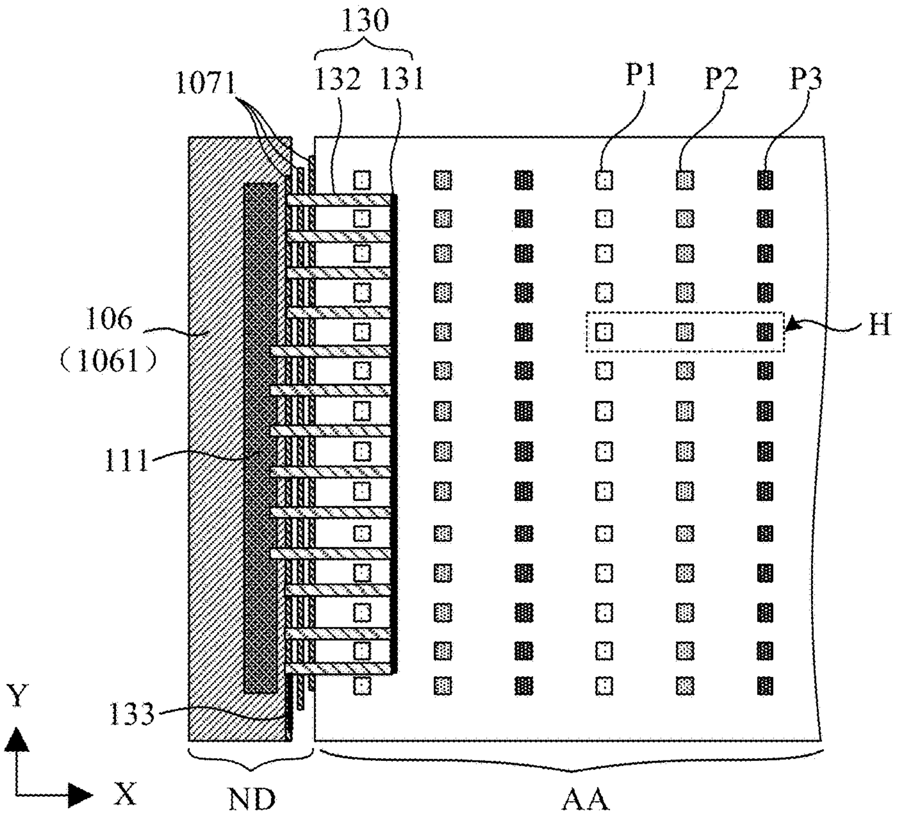
FIG. 11 is a schematic diagram of a planar structure of a display substrate according to an exemplary implementation of the present disclosure.

The implementation of the present disclosure also provides a display substrate. as shown in FIG. 9 to FIG. 11, the display substrate can include a display region AA and a non-display region ND, the display region AA is provided with a plurality of sub-pixels P arranged in an array, and the display substrate can also include the antenna described in any of the above implementations, and the antenna is located in the display region AA and the non-display region ND;

The display substrate is provided with a base substrate 100 along a third direction (Z direction in FIG. 9) and a drive structure layer 101, a light emitting structure layer, a power supply line layer 106, and an encapsulation layer 105 sequentially disposed on the base substrate 100; the drive structure layer 101 includes a pixel drive circuit located in the display region AA, the light emitting structure layer may include a plurality of light emitting elements located in the display region, the sub-pixel P may include a pixel drive circuit and a light emitting element, and the power supply line layer 106 may include a low-level power supply line 1061; the low-level power supply line 1061 is electrically connected with the light emitting element;

an orthographic projection of the second conductive layer 13 in the antenna on the base substrate 100 is not overlapped with an orthographic projection of the plurality of light emitting elements on the base substrate 100.

In an exemplary implementation, the power supply line layer 106 may be multiplexed into the first conductive layer 11 of the antenna.

In an exemplary implementation, the second conductive layer 13 of the antenna is located at a side of the encapsulation layer 105 away from the base substrate 100.

In an exemplary implementation, as shown in FIG. 9-FIG. 10 and FIG. 13-FIG. 16, a part of the low-level power supply line located at the non-display region is provided with an slot 111, a surface of the low-level power supply line away from and/or close to the display region AA is not flat, and the thickness of the low-level power supply line provided with the slot 111 in the first direction X is greater than the thickness of the low-level power supply line without the slot 111.

In an exemplary implementation, in the structure shown in FIG. 9, the encapsulation layer 105 may be multiplexed as a dielectric layer of the antenna.

In an exemplary implementation, as shown in FIG. 10, the display substrate may further include a touch structure layer 107 and a transparent insulation layer 108; the touch structure layer 107 is located at a side of the encapsulation layer 105 away from the base substrate 100, the second conductive layer 13 of the antenna is located at a side of the touch structure layer 107 away from the encapsulation layer 105, and the transparent insulation layer 108 is disposed between the second conductive layer 13 and the touch structure layer 107.

As shown in FIG. 9 and FIG. 10, the touch structure layer 107 may include touch traces 1071 and touch electrodes 1072.

In an exemplary implementation, the transparent insulation layer 108 may be multiplexed as a dielectric layer of the antenna.

In an exemplary implementation, the touch structure layer 107 may be multiplexed into the first conductive layer 11 of the antenna described above. In the implementation of the present disclosure, the touch structure layer 107 and the power supply line layer 106 may be simultaneously multiplexed into the first conductive layer 11 of the antenna described above.

In an exemplary implementation, the touch structure layer 107 may include a touch electrode layer; the touch electrode layer may include touch electrodes located in the display region AA and touch traces located in the non-display region ND.

In an exemplary implementation, as shown in FIG. 10, an orthographic projection of the touch structure layer 107 on the base substrate is not overlapped with the orthographic projection of the slot on the base substrate.

In an exemplary implementation, as shown in FIG. 11, an orthographic projection of the touch traces 1071 on the base substrate and an orthographic projection of the second conductive layer 13 in the antenna on the base substrate may be partially overlapped.

In an exemplary implementation, as shown in FIG. 9, the light emitting structure layer may include an anode structure layer 102, a light emitting layer 103, and a cathode structure layer 104 which are sequentially stacked. The drive structure layer 101 (the drive structure layer 101 may include a gate driver on array circuit layer 1011, a planar insulation layer 1012, a pixel drive circuit layer 1013), an anode structure layer 102, and a light emitting layer 103 (the light emitting layer 103 may include a pixel structure layer 1031 and a pixel defining layer 1032) may extend to the non-display region ND;

an orthographic projection of the cathode structure layer 104 on the plane where the encapsulation layer 105 is located is overlapped with an orthographic projection of the power supply line 106 on the plane where the encapsulation layer 105 is located, and the orthographic projection of the cathode structure layer 104 on the plane where the encapsulation layer 105 is located is not overlapped with an orthographic projection of the slot 111 on the plane where the encapsulation layer 105 is located.

In an exemplary implementation, as shown in FIG. 10, an orthographic projection of the cathode structure layer 104 and the touch layer 107 on the base substrate 100 is overlapped with an orthographic projection of the low-level power supply line 1061 on the base substrate 100, and an orthographic projection of the cathode structure layer 104 and the touch structure layer 107 on the plane where the encapsulation layer 105 is located is not overlapped with the orthographic projection of the slot 111 on the plane where the encapsulation layer 105 is located.

In implementations of the present disclosure, the thickness of the low-level power supply line 1061 (the dimension of the low-level power supply line 1061 in which the power supply line 106 is located in the non-display region in the Z direction in FIG. 9-FIG. 10) is set to be relatively thick, such that the low-level power supply line 1061 may have a good electrical conductivity on the premise that the display substrate has a narrow bezel, so that the low-level power supply line 1061 can uniformly conduct pixel currents supplied at different positions of the display substrate. For example, the thickness of the low-level power supply line 1061 may be equal to or more than 1 micron. In the implementation of the present disclosure, the low-level power supply line 1061 may be an ELVSS signal line in the display substrate. In implementations of the present disclosure, the non-display region ND of the display substrate can be understood as a bezel of the display substrate. Usually, the narrower the bezel of the display substrate, the better the visual effect. The width of the low-level power supply line 1061 (the size of the power supply line 106 along the direction X in FIG. 9-10) is not increased, the bezel of the display substrate is not increased, and the thickness of the low-level power supply line 1061 (the size of the power supply line 106 in the Z direction in FIG. 9-10) is increased, so that the pixel circuit provided to the display substrate can be uniformly conducted without increasing the bezel of the display substrate.

In the implementation of the present disclosure, in the structure shown in FIG. 9 and FIG. 10, the thickness of the encapsulation layer 105 is about one thousand times of the thickness of the cathode structure layer 104, and the thickness of the encapsulation layer 105 is about forty times of the thickness of the pixel structure layer 1031. The structure shown in FIG. 9 and FIG. 10 is only a schematic diagram of the structure, and is not strictly illustrated according to the scale of the actual structure. In an exemplary implementation, the pixel structure layer 1031 may an organic emitting layer and may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked.

In implementations of the present disclosure, the display substrate may be an organic electroluminescent diode (OLED) panel or another type of display substrate, which is not limited in the present disclosure.

In the implementation of the present disclosure, a portion of the drive structure layer 101 located in the display region AA may be provided with a pixel drive circuit, and a portion of the drive structure layer 101 located in the non-display region ND may be provided with a Gate Driver on Array (GOA) circuit.

In an exemplary implementation, as shown in FIG. 11, which is a schematic diagram of a partial planar structure of the sectional structure shown in FIG. 9 and FIG. 10, the second conductive layer 13 in the antenna may include at least one conductive structure 130, the conductive structure 130 is a comb structure, the conductive structure 130 includes a first conductive element 131 constituting a comb back of the comb structure and a plurality of second conductive elements 132 constituting comb teeth of the comb structure;

the first conductive element 131 is located in the display region AA, first ends of the plurality of second conductive elements 132 are located in the display region AA, second ends of the plurality of second conductive elements 132 are located in the non-display region ND, the first ends of the plurality of second conductive elements 132 are connected with the first conductive elements 131, and an orthographic projection of the second ends of at least a portion of the second conductive elements 132 on the base substrate 100 is within the range of the orthographic projection of the slot 111 on the base substrate 100.

In an exemplary implementation, the second conductive layer 13 is disposed in the display region AA and the non-display region ND of the display substrate, as shown in FIG. 11, the first conductive element 131 and the second conductive element 132 may be provided in a solid structure; in the display region AA, the first conductive element 131 and the second conductive element 132 are disposed in spaced regions of the plurality of sub-pixels P, and the orthographic projections of the first conductive element 131 and the second conductive element 132 on the base substrate 100 are not overlapped with the orthographic projections of the plurality of sub-pixels P on the base substrate 100.

In an exemplary implementation, as shown in FIG. 12*a* to FIG. 12*d*, which are schematic diagrams of other partial planar structure of the sectional structures shown in FIG. 9 and FIG. 10, at least one of the first conductive element 131 and the second conductive element 132 is a hollow structure provided with a hollowed-out structure M, orthographic projections of the first conductive element 131 provided with the hollowed-out structure M and the second conductive element 132 provided with the hollowed-out structure M on the base substrate 100 and an orthographic projection of a portion of sub-pixels of the plurality of sub-pixels P on the base substrate 100 have an overlapped region, and the overlapped region is within the range of an orthographic projection of the hollowed-out structure M on the base substrate 100.

Figure 12A:
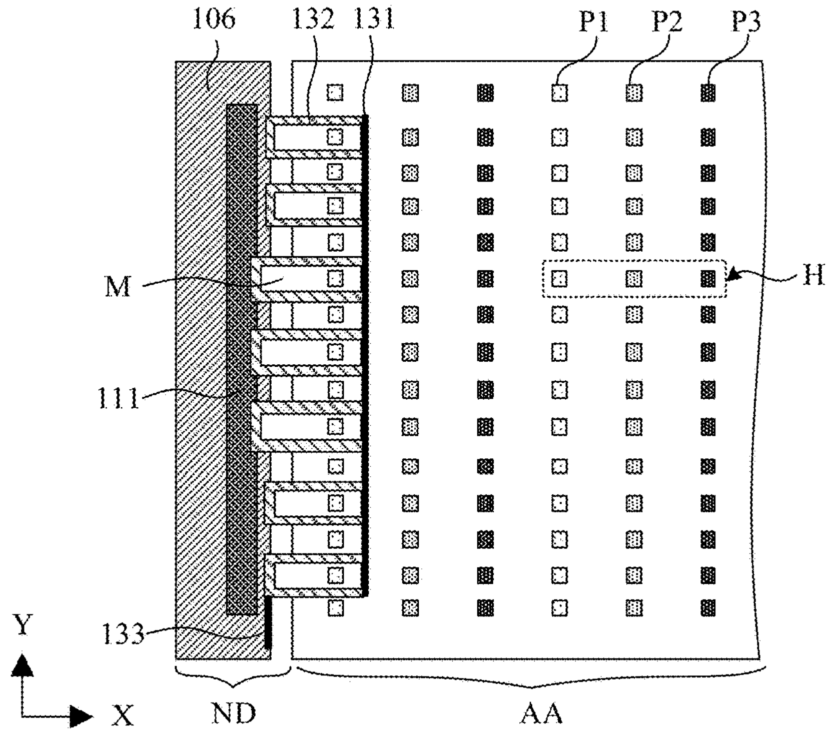
FIG. 12*a* is a schematic diagram of a partial planar structure of a display substrate according to an exemplary implementation of the present disclosure.
Figure 12B:
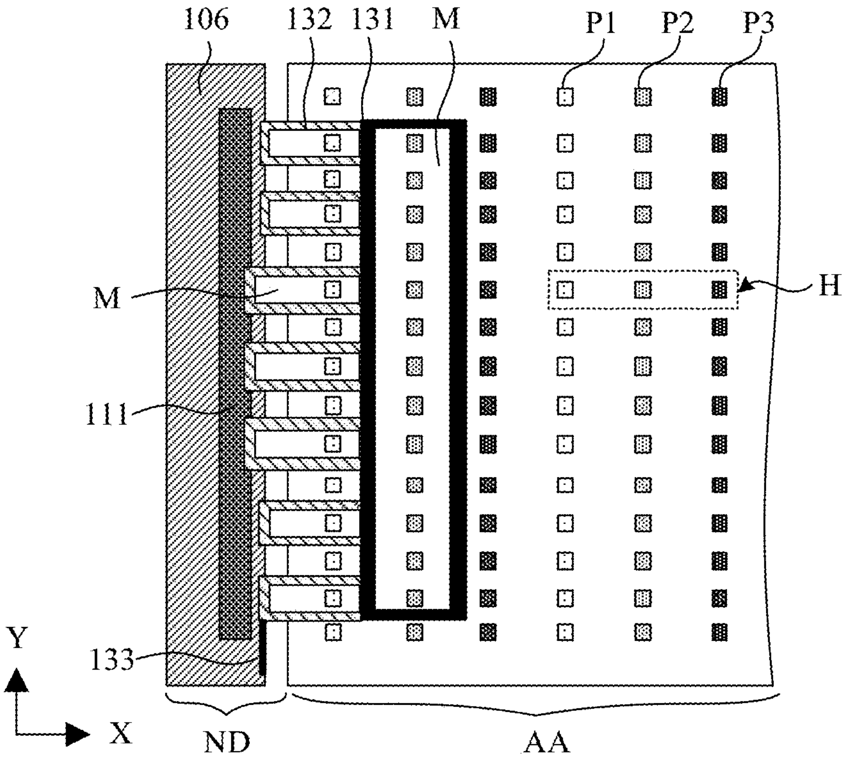
FIG. 12*b* is a schematic diagram of a partial planar structure of a display substrate according to an exemplary implementation of the present disclosure.
Figure 12C:
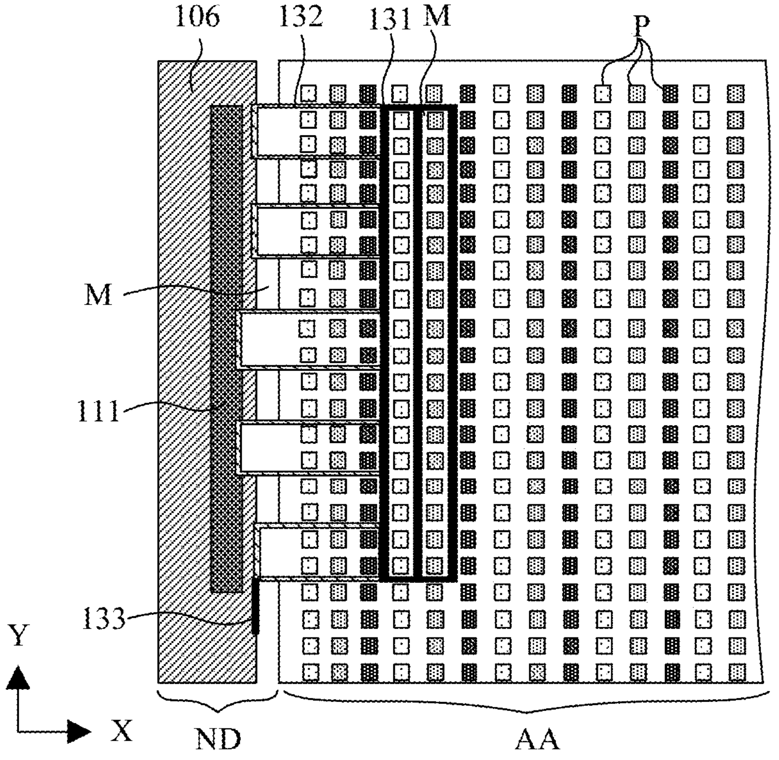
FIG. 12*c* is a schematic diagram of a partial planar structure of a display substrate according to an exemplary implementation of the present disclosure.
Figure 12D:
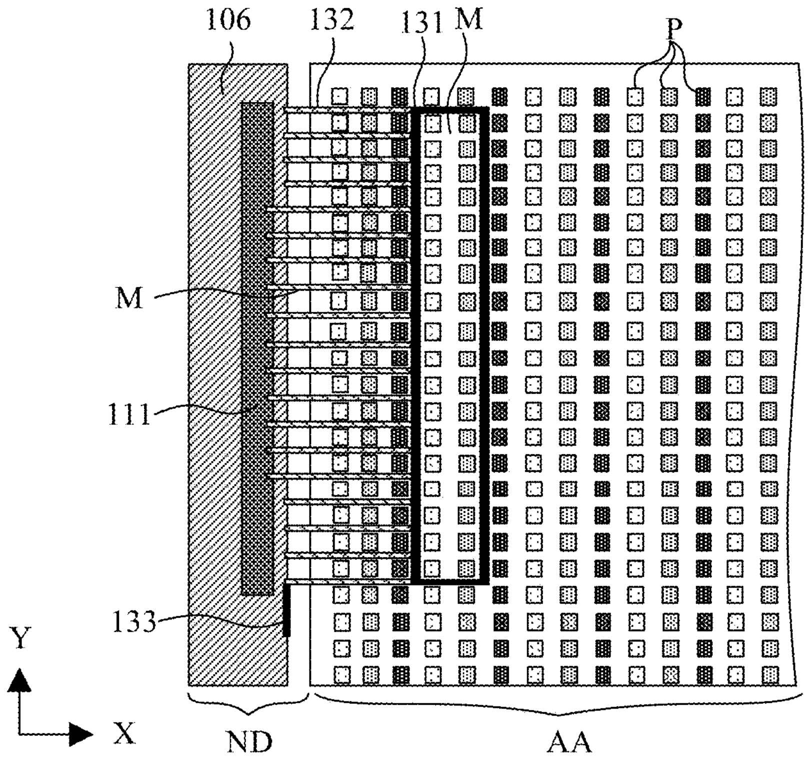
FIG. 12*d* is a schematic diagram of a partial planar structure of a display substrate according to an exemplary implementation of the present disclosure.
Figure 12E:
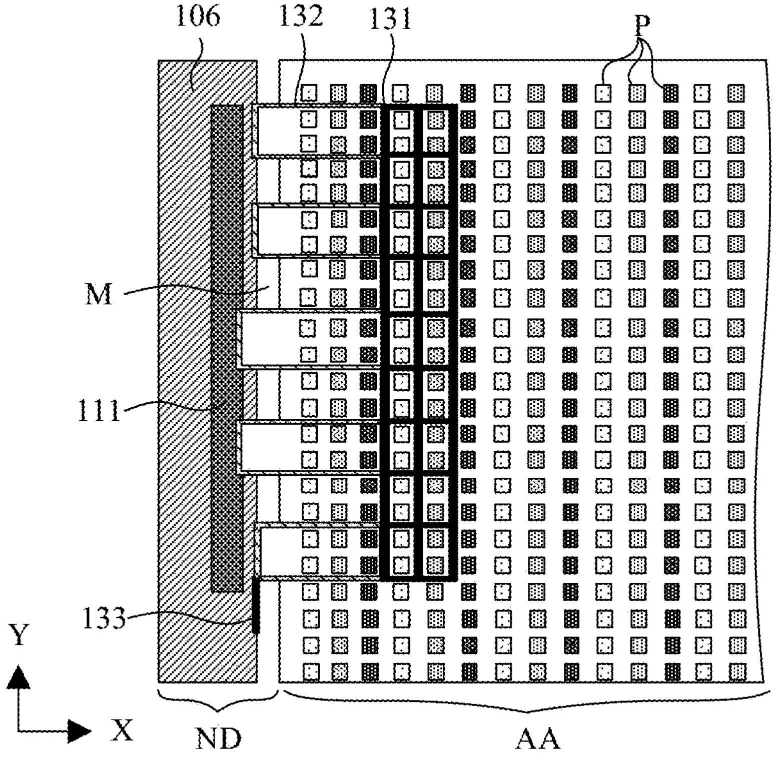
FIG. 12*e* is a schematic diagram of a partial planar structure of a display substrate according to an exemplary implementation of the present disclosure.

In an exemplary implementation, as shown in FIG. 12*e*, which is schematic diagram of another planar structure of FIG. 9 and FIG. 10, the first conductive element 131 is provided in a grid structure, grid lines of the grid structure are disposed in spaced regions of adjacent sub-pixels P, and orthographic projections of the grid lines of the grid structure on the base substrate 100 are not overlapped with orthographic projections of the plurality of sub-pixels P on the base substrate 100.

In the structure shown in FIG. 11 to FIG. 12*e*, the plurality of sub-pixels P at least include a first pixel P1, a second pixel P2, and a third pixel P3, and adjacent first pixel P1, second pixel P2, and third pixel P3 constitute one pixel unit H.

In the structure shown in FIG. 12*a* to FIG. 12*d*, in a structure in which the display substrate is provided with the antenna, a region of the first conductive element 131 and the second conductive element 132 in the conductive structure of the comb structure corresponding to the plurality of sub-pixels P in the display region AA is provided in a hollowed-out structure, the first conductive element 131 of FIG. 12*e* is provided in a grid structure, the hollow structure M and the grid structure can avoid shielding the pixel P, and do not need to passivate the non-antenna region in order to make the light transmittance of the antenna region and the non-antenna region consistent, thereby greatly improving the light transmittance of the display substrate, and there is no defect that the light transmittance of the antenna region and the non-antenna region is inconsistent.

In the structure shown in FIG. 11, in a structure in which the display substrate is provided with the antenna, in a region of the first conductive element 131 and the second conductive element 132 in the conductive structure of the comb structure corresponding to the plurality of pixels P in the display region AA, the first conductive element 131 and the second conductive element 132 correspond to spaced regions of the plurality of pixels P, which is also possible to avoid shielding the pixel P, and it is not necessary to passivate the non-antenna region in order to make the light transmittance of the antenna region and the non-antenna region consistent, thereby greatly improving the light transmittance of the display substrate, and there is no defect that the light transmittance of the antenna region and the non-antenna region is inconsistent.

In the structure described in FIG. 11-FIG. 12*e*, the conductive structure 130 of the comb structure can be provided as a transparent structure, so that the first conductive element 131 and the second conductive element 132 can be flexibly disposed in the plurality of sub-pixels P, and the sub-pixels P will not be shielded.

In the implementation of the present disclosure, in the structure as described in FIG. 11-FIG. 12*e*, the arrangement may be made according to the arrangement of the plurality of sub-pixels P and the structure of the conductive structure 130 of the comb structure in the antenna, for example, one second conductive element 132 may be disposed between two adjacent pixels P, as shown in FIG. 11; or, the second conductive element 132 and the first conductive element 131 may be provided in a hollowed-out structure, the hollowed-out structure M corresponds to one or more sub-pixels P, and one or more sub-pixels P may be corresponded between two adjacent second conductive elements 132, as shown in FIG. 12*a*-FIG. 12*d*.

Figure 13:
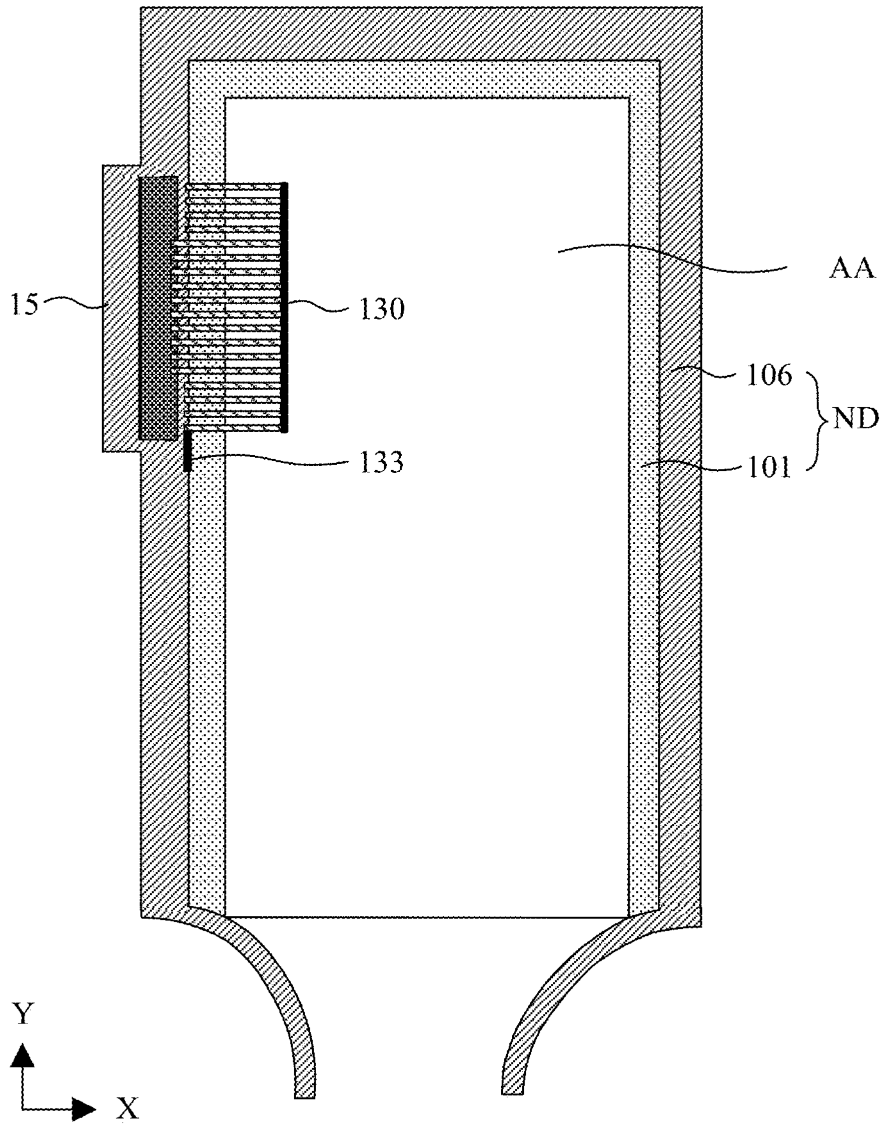
FIG. 13 is a schematic diagram of a planar structure of a display substrate according to an exemplary implementation of the present disclosure.
Figure 14:
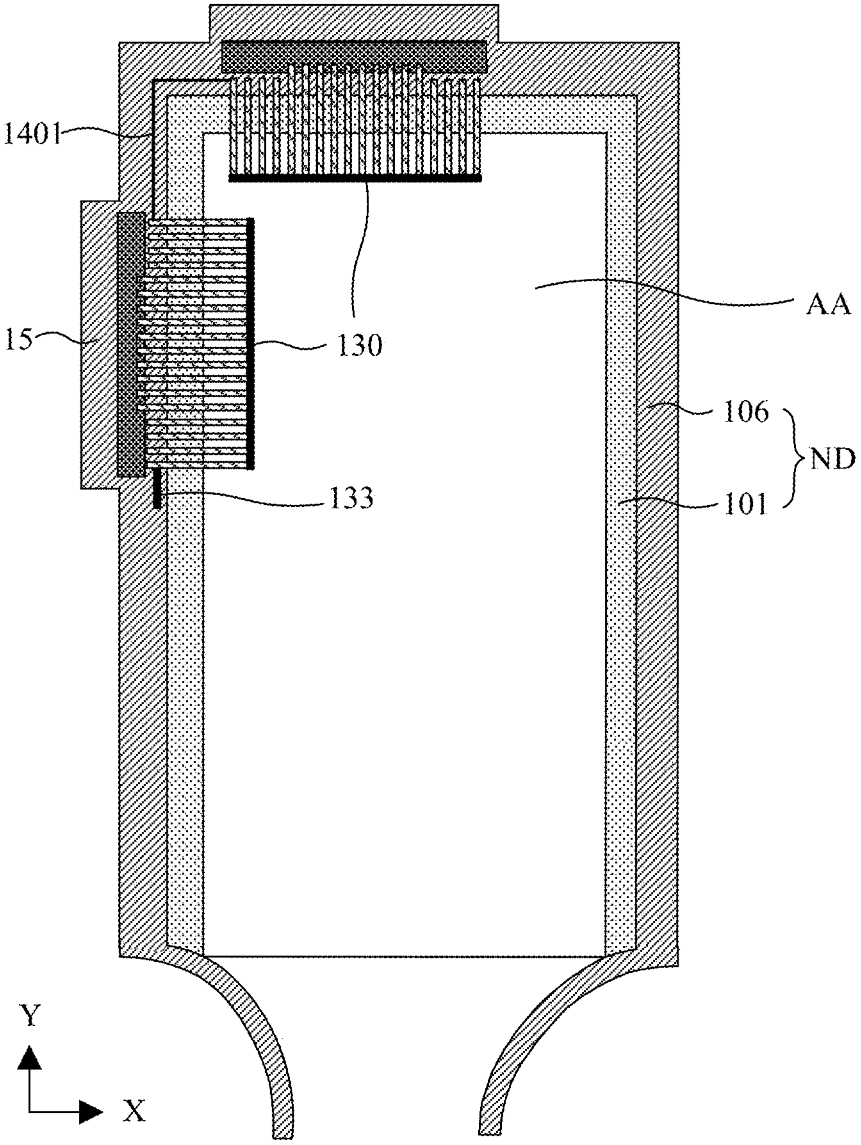
FIG. 14 is a schematic diagram of a planar structure of a display substrate according to an exemplary implementation of the present disclosure.

In an exemplary implementation, the display substrate may be provided with one or conductive structures of the comb structure 130, as shown in FIG. 13, one conductive structure of the comb structure 130 may be disposed on the display substrate of the display device, a linearly polarized radiation antenna is shown in FIG. 13. As shown in FIG. 14, in a structure in which the display substrate is provided with a plurality of conductive structures 130 of the comb structure, two adjacent conductive structures of the comb structure are connected through an antenna connection line 1401 disposed in the non-display region ND, and the two conductive structures 130 of the comb structure shown in FIG. 14 constitute an antenna for circularly polarized radiation.

In an exemplary implementation, as shown in FIG. 14, comb teeth in two adjacent conductive structures 130 of the comb structure which are close to each other are connected through the antenna connection line 1401, that is, comb teeth at the ends of two conductive structures 130 of the comb structure in FIG. 14 which are close to each other are connected through the antenna connection line 1401.

In the implementation of the present disclosure, in the structure shown in FIG. 9-FIG. 10 and FIG. 13-FIG. 16, a region where the thickness of the low-level power supply line provided with the slot 111 is greater than the thickness of the low-level power supply line without the slot 111 along the first direction X can be used as a compensation structure for the low-level power supply line.

In the exemplary implementation, as shown in FIG. 13 and FIG. 14, a compensation structure 15 with a volume coincident with the volume of the slot 111 is disposed along the width direction of the low-level power supply line 1061, and the compensation structure 15 is disposed at one side or both sides of the power supply line 106.

Figure 15:
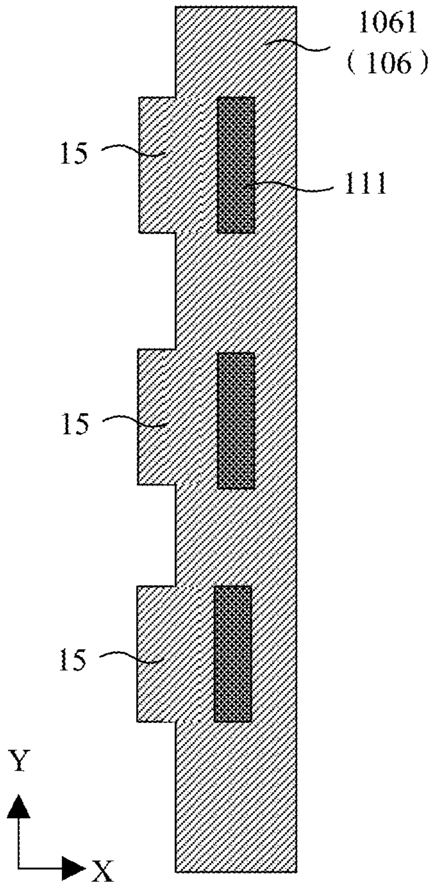
FIG. 15 is a schematic diagram of a partial planar structure of a power supply line provided with a compensation structure according to an exemplary implementation of the present disclosure.
Figure 16:
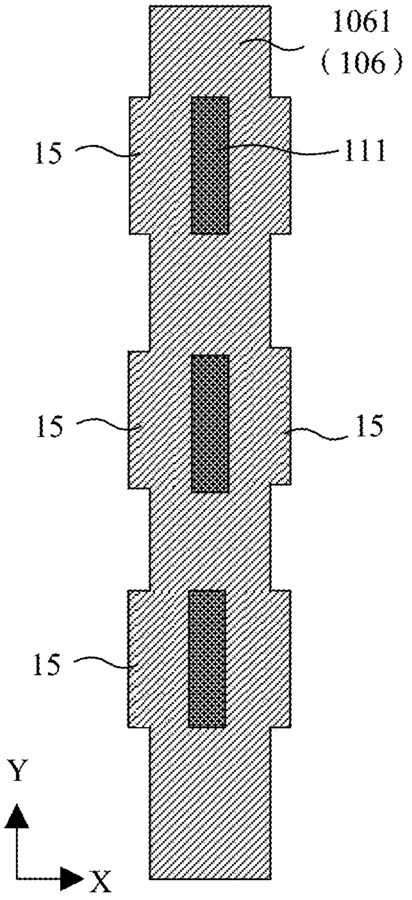
FIG. 16 is a schematic diagram of a partial planar structure of another power supply line provided with a compensation structure according to an exemplary implementation of the present disclosure.

In the structure shown in FIG. 13-FIG. 15, the compensation structures 15 are disposed at one side of the low-level power supply line 1061 and the width of each compensation structure substantially coincides with the width of the slot 111. In the structure shown in FIG. 16, the compensation structures 15 are disposed at both sides of the low-level power supply line 1061 and the width of each compensation structure is about 0.5 times of the width of the slot 111.

In the implementation of the present disclosure, the compensation structure 15 is disposed at one side or both sides of the slot 111, so that the square resistance on the low-level power supply line 1061 can be kept as consistent as possible with that on the structure without the slot 111 on the premise of ensuring a narrow bezel of the display substrate. A slot 111 is provided on the low-level power supply line 1061, in the absence of the compensation structure 15, the square resistance on the low-level power supply line 1061 becomes larger. When the power supply line 106 is provided with a plurality of slots (array antennas are provided), the signal supplied by the low-level power supply line 1061 to the pixel P in the display substrate will be obviously interfered. After the compensation structure 15 is provided, the interference of the slots 111 to the voltage signal supplied by the low-level power supply line 1061 can be reduced as much as possible. In a case where there are not many slots in the low-level power supply line 1061, the signal supplied to the pixel P in the display substrate by the low-level power supply line 1061 is not significantly interfered, and the compensation structure 15 may not be provided.

In the implementation of the present disclosure as shown in FIG. 13 and FIG. 14, the low-level power supply line 1061 may be disposed around the display region AA.

An implementation of the present disclosure further provides a display device which includes the display substrate in any one of the aforementioned implementations.

In exemplary implementations, the display device may be any product or component having a display substrate of any of the above implementations, such as a mobile phone, a tablet computer, a television, a displayer, a laptop, a digital photo frame, a navigator, a wearable device (such as a wearable watch, a bracelet, etc.), a Personal Digital Assistant (PDA), etc.

An antenna, a display substrate and a display device are provided by the implementation of the present disclosure, the antenna includes a first conductive layer, a dielectric layer, a second conductive layer which are stacked, a slot is provided on the first conductive layer, a conductive structure of a comb structure is disposed on the second conductive layer, each conductive structure of the comb structure includes a first conductive element and a plurality of second conductive elements, the first conductive element constitutes a comb back of the comb structure, the plurality of second conductive elements constitute a comb teeth of the comb structure, the radiation efficiency of the antenna is greatly improved by providing a slot on the first conductive layer, and an orthographic projection of the second end of at least a portion of a second conductive element on the dielectric layer in the conductive structure of the comb structure on the second conductive layer is within the range of an orthographic projection of the slot on the dielectric layer.

The drawings of the implementations of the present disclosure only involve structures involved in the implementations of the present disclosure, and other structures may refer to usual designs.

The implementations of the present disclosure, that is, features in the implementations, may be combined with each other to obtain new implementations if there is no conflict.

Although the implementation modes disclosed in the implementations of the present disclosure are described above, the described contents are only implementation modes for facilitating understanding of the implementations of the present disclosure, which are not intended to limit the implementations of the present disclosure. Those of skilled in the art to which the implementations of the present disclosure pertain may make any modifications and variations in forms and details of implementation without departing from the spirit and scope of the implementations of the present disclosure. Nevertheless, the scope of patent protection of the implementations of the present disclosure shall still be subject to the scope defined by the appended claims.

The invention claimed is:

1. An antenna comprising a first conductive layer, a dielectric layer, and a second conductive layer which are stacked; wherein the first conductive layer is provided with at least one slot;

the second conductive layer comprises at least one conductive structure, the conductive structure is a comb structure, the conductive structure comprises a first conductive element and a plurality of second conductive elements, the first conductive element constitutes a comb back of the comb structure, and the plurality of second conductive elements constitute comb teeth of the comb structure;

the at least one conductive structure is disposed corresponding to the at least one slot, in the at least one conductive structure, first ends of the plurality of second conductive elements are connected with the first conductive element, and orthographic projections of second ends of at least a portion of the second conductive elements on the dielectric layer are within an orthographic projection of a slot on the dielectric layer, wherein the first conductive element comprises: a first side and a second side oppositely disposed, and a third side and a fourth side oppositely disposed, the second conductive elements are located at the first side or the second side of the first conductive element;

the plurality of second conductive elements are arranged along a second direction;

the first conductive element has a grid structure or a strip structure, wherein the second conductive elements comprise first sub-conductive elements and second sub-conductive elements, wherein the first sub-conductive elements and the second sub-conductive elements are alternately disposed along the second direction;

the first sub-conductive elements and the second sub-conductive elements are of hollow structures or solid structures;

lengths of the first sub-conductive elements along a first direction are greater than lengths of the second sub-conductive elements along the first direction; orthographic projections of second ends of the first sub-conductive elements on the dielectric layer are within a range of an orthographic projection of the slot on the dielectric layer, and orthographic projections of second ends of the second sub-conductive elements on the dielectric layer are not overlapped with the orthographic projection of the slot on the dielectric layer.

2. The antenna according to claim 1, wherein the slot is provided with a dielectric, and the dielectric in the slot is formed by a same process as the dielectric layer;

in an arrangement direction of the plurality of second conductive elements, the orthographic projection of the slot on the dielectric layer exceeds an orthographic projection of the plurality of second conductive elements on the dielectric layer;

the second conductive layer is a transparent conductive layer.

3. The antenna according to claim 1, further comprising a feeder line;

the feeder line is disposed at the third side or the fourth side of the first conductive element.

4. The antenna according to claim 3, wherein the at least one slot comprises a first slot and a second slot; the at least one conductive structure comprises a first conductive structure and a second conductive structure;

a first conductive element in the first conductive structure and a first conductive element in the second conductive structure are connected.

5. The antenna according to claim 4, wherein an arrangement direction of a plurality of second conductive elements in the first conductive structure is parallel to an arrangement direction of a plurality of second conductive elements in the second conductive structure;

first sub-conductive elements in the first conductive structure and first sub-conductive elements in the second conductive structure are symmetrically disposed with respect to a center line of the first conductive structure and the second conductive structure along the second direction, second sub-conductive elements in the first conductive structure and second sub-conductive elements in the second conductive structure are disposed symmetrically with respect to a center line of the first conductive structure and the second conductive structure along the second direction.

6. The antenna according to claim 5, further comprising a first connection line, wherein the first conductive element of the first conductive structure and the first conductive element of the second conductive structure are arranged in parallel and electrically connected through the first connection line, the first connection line is disposed to connect two ends of a comb back of the first conductive structure and a comb back of the second conductive structure which are close to each other.

7. The antenna according to claim 6, wherein the feeder line is connected with the first connection line, the feeder line divides the first connection line into a first sub-connection line and a second sub-connection line, the first sub-connection line is located between the feeder line and the first conductive structure, the second sub-connection line is located between the feeder line and the second conductive structure;

a length of the first connection line is a length of a wavelength of an electromagnetic wave transmitted or received by the antenna.

8. The antenna according to claim 7, wherein a longer one of the first sub-connection line and the second sub-connection line is of a straight line type or a polygonal line type.

9. The antenna according to claim 7, wherein the length of the first sub-connection line is equal to a length of the second sub-connection line, or a difference between the length of the first sub-connection line and the length of the second sub-connection line is 0.4 to 0.6 times of the length of the wavelength of the electromagnetic wave.

10. The antenna according to claim 4, wherein an arrangement direction of a plurality of second conductive elements in the first conductive structure is parallel to an arrangement direction of a plurality of second conductive elements in the second conductive structure; in the plurality of second conductive elements, the first sub-conductive elements constitute long teeth of the comb structure, and the second sub-conductive elements constitute short teeth of the comb structure;

first sub-conductive elements in the first conductive structure and second sub-conductive elements in the second conductive structure are correspondingly disposed along the first direction to form a complementary structure of the long teeth and the short teeth in the first direction; second sub-conductive elements in the first conductive structure and first sub-conductive elements in the second conductive structure are correspondingly disposed along the first direction to form a complementary structure of the long teeth and the short teeth in the first direction.

11. The antenna according to claim 10, wherein the first conductive element in the first conductive structure and the first conductive element in the second conductive structure are a same conductive element;

the second conductive elements of the first conductive structure are located at the first side of the first conductive element, and the second conductive elements of the second conductive structure are located at the second side of the first conductive element.

12. The antenna according to claim 4, wherein an included angle between a first conductive element in the first conductive structure and a first conductive element in the second conductive structure is greater than 0 degree and less than 180 degrees.

13. The antenna according to claim 12, further comprising a first connection line; wherein the first conductive element of the first conductive structure and the first conductive element of the second conductive structure are electrically connected through the first connection line, the first connection line is disposed to connect two ends of a comb back of the first conductive structure and a comb back of the second conductive structure which are close to each other;

the feeder line is disposed at an end of the first conductive structure away from the second conductive structure, and a length of the first connection line is 0.7 times to 0.8 times of a length of a wavelength of an electromagnetic wave transmitted or received by the antenna; or, the feeder line is disposed at an end of the second conductive structure away from the first conductive structure, and the length of the first connection line is 0.7 times to 0.8 times of the length of the wavelength of the electromagnetic wave transmitted or received by the antenna; or, the feeder line is disposed on the first connection line, the feeder line divides the first connection line into a first sub-connection line and a second sub-connection line, the first sub-connection line is located between the feeder line and the first conductive structure, the second sub-connection line is located between the feeder line and the second conductive structure, the length of the first connection line is the length of the wavelength of the electromagnetic wave transmitted or received by the antenna, and a difference between the length of the first sub-connection line and the length of the second sub-connection line is 0.4 to 0.6 times of the length of the wavelength of the electromagnetic wave.

14. The antenna according to claim 1, wherein the conductive structure of the comb structure comprises at least one positive radiation field and at least one negative radiation field, the positive radiation field of the antenna corresponds to regions of the first sub-conductive elements, and the negative radiation field of the antenna corresponds to regions of the second sub-conductive elements; or, the negative radiation field of the antenna corresponds to the regions of the first sub-conductive elements, and the positive radiation field of the antenna corresponds to the regions of the second sub-conductive elements.

15. A display substrate, comprising a display region and a non-display region; wherein the display region is provided with a plurality of sub-pixels arranged in an array; the display substrate further comprises the antenna according to claim 1, the antenna is located in the display region and the non-display region;

the display substrate is provided along a third direction with a base substrate and a drive structure layer, a light emitting structure layer, a power supply line layer and an encapsulation layer which are sequentially stacked on the base substrate; the drive structure layer comprises a pixel drive circuit located in the display region, the light emitting structure layer comprises a plurality of light emitting elements located in the display region, the sub-pixel comprises a pixel drive circuit and a light emitting element, and the power supply line layer comprises a low-level power supply line; the low-level power supply line is electrically connected with the light emitting element;

an orthographic projection of the second conductive layer in the antenna on the base substrate is not overlapped with an orthographic projection of the plurality of light emitting elements on the base substrate.

16. The display substrate according to claim 15, wherein the power supply line layer is reused as the first conductive layer of the antenna, and the second conductive layer of the antenna is located at a side of the encapsulation layer away from the base substrate;

a part of the low-level power supply line located at the non-display region is provided with a slot, a surface of the low-level power supply line away from the display region and/or close to the display region is not flat, and a thickness of the low-level power supply line provided with the slot along the first direction is greater than a thickness of the low-level power supply line without the slot.

17. The display substrate according to claim 16, wherein the encapsulation layer is reused as a dielectric layer of the antenna.

18. The display substrate according to claim 15, further comprising a touch structure layer and a transparent insulation layer; the touch structure layer is located at a side of the encapsulation layer away from the base substrate, the second conductive layer of the antenna is located at a side of the touch structure layer away from the encapsulation layer, and the transparent insulation layer is disposed between the second conductive layer and the touch structure layer;

the transparent insulation layer is used as a dielectric layer of the antenna, and the touch structure layer is used as a first conductive layer of the antenna;

the touch structure layer comprises a touch electrode layer; the touch electrode layer comprises a touch electrode located in the display region and a touch trace located in the non-display region;

an orthographic projection of the touch structure layer on the base substrate is not overlapped with an orthographic projection of a slot on the base substrate, and an orthographic projection of the touch trace on the base substrate is overlapped with an orthographic projection of the second conductive layer in the antenna on the base substrate.

* * * * *